United States Patent
Nagoshi

(10) Patent No.: US 12,304,722 B2
(45) Date of Patent: May 20, 2025

(54) DISPENSING CONTAINER WITH CUTTER, SOLID MATERIAL CONTAINER, AND SOLID MATERIAL ROTARY CUTTING LID

(71) Applicant: SHISEIDO COMPANY, LTD., Tokyo (JP)

(72) Inventor: Masahiko Nagoshi, Tokyo (JP)

(73) Assignee: SHISEIDO COMPANY, LTD., Tokyo (JP)

( * ) Notice: Subject to any disclaimer, the term of this patent is extended or adjusted under 35 U.S.C. 154(b) by 987 days.

(21) Appl. No.: 17/309,024

(22) PCT Filed: Oct. 17, 2019

(86) PCT No.: PCT/JP2019/040918
§ 371 (c)(1),
(2) Date: Apr. 15, 2021

(87) PCT Pub. No.: WO2020/080471
PCT Pub. Date: Apr. 23, 2020

(65) Prior Publication Data
US 2022/0009701 A1  Jan. 13, 2022

(30) Foreign Application Priority Data

Oct. 19, 2018  (JP) .................................. 2018-197870

(51) Int. Cl.
*B65D 83/00* (2006.01)
*B26D 1/29* (2006.01)
(Continued)

(52) U.S. Cl.
CPC ............... *B65D 83/76* (2025.01); *B26D 1/29* (2013.01); *B26D 3/00* (2013.01); *B26D 3/28* (2013.01); *B65D 83/761* (2025.01)

(58) Field of Classification Search
CPC ............ B65D 83/0022; B65D 83/0016; B65D 83/0072; B65D 83/0011; B65D 83/0027;
(Continued)

(56) References Cited

U.S. PATENT DOCUMENTS 2,485,467 A * 10/1949 Weisbaum ........... B65D 83/761
222/390
2,656,953 A * 10/1953 Rich .................... B65D 83/761
222/386
(Continued)

FOREIGN PATENT DOCUMENTS

CA       2847158 A1 *  3/2014
JP       S56-011737 U   7/1981
(Continued)

OTHER PUBLICATIONS

Office Action issued in the counterpart Japanese Patent Application No. 2023-088388, mailed Oct. 31, 2023.
(Continued)

*Primary Examiner* — Adam J Eiseman
*Assistant Examiner* — Fernando A Ayala
(74) *Attorney, Agent, or Firm* — IPUSA, PLLC

(57) ABSTRACT

A dispensing container with a cutter, in which a storage part can be used as a refill. A dispensing container 100 with a cutter 54 includes a storage part 1, a helical tube 2, a rotating lid 5, and a movable plate 3. The storage part 1 has a tubular shape with an opening at a top and is configured to contain a solid material. The helical tube 2 has a helical groove on an outer peripheral surface thereof, and is configured to be attached to a bottom surface of the storage part. The rotating lid 5 is disposed to be horizontally rotatable and includes a top plate 51 and a peripheral wall 52 that is a side surface. The top plate 51 is provided with the cutter 54 on an underside thereof and has an outlet 53. The cutter 54 is
(Continued)

configured to cut the solid material into a thin piece, and the outlet 53 is configured to discharge the cut thin piece of the solid material. The movable plate 3 has a hole into which the helical tube is fitted, and is configured to be raised within the storage part in conjunction with rotation of the rotating lid. The top plate 51 of the rotating lid has a fitting projection 55 that extends downward to be inserted into an upper end of the helical tube 2 so as to cause the helical tube 2 to rotate together with the rotating lid.

19 Claims, 32 Drawing Sheets

(51) Int. Cl.
  *B26D 3/00* (2006.01)
  *B26D 3/28* (2006.01)
  *B65D 83/76* (2025.01)
  *B65D 83/761* (2025.01)
(58) Field of Classification Search
  CPC ............ B65D 83/0044; B65D 83/0005; A45D 40/0075
  See application file for complete search history.

(56) References Cited

U.S. PATENT DOCUMENTS

| | | | | |
|---|---|---|---|---|
| 3,289,891 | A * | 12/1966 | Frankenberg | B65D 1/0292 222/386 |
| 4,139,127 | A * | 2/1979 | Gentile | B65D 83/761 401/175 |
| 4,199,112 | A * | 4/1980 | McLean | A47J 43/06 241/92 |
| 4,256,265 | A * | 3/1981 | Madan | B26D 3/22 83/356.3 |
| 4,901,435 | A * | 2/1990 | Tahara | B65D 17/521 220/267 |
| 4,921,130 | A * | 5/1990 | Hollberg | B65D 83/0011 222/536 |
| 6,039,483 | A | 3/2000 | Szekely | |
| 6,116,469 | A * | 9/2000 | Wallays | A47G 19/24 222/565 |
| 7,377,203 | B2 * | 5/2008 | Chomik | B65F 1/1607 83/648 |
| 8,079,499 | B2 * | 12/2011 | Juteau | B65D 83/0011 401/175 |
| D652,678 | S * | 1/2012 | Holgersson | D7/378 |
| 8,701,941 | B2 * | 4/2014 | Fuller | B65D 83/06 222/148 |
| 9,204,659 | B2 * | 12/2015 | Lee | A23G 9/22 |
| 10,865,034 | B2 * | 12/2020 | Beasley | B65D 83/768 |
| 11,325,274 | B1 * | 5/2022 | Leung | B26D 7/2614 |
| 11,986,080 | B2 * | 5/2024 | Li | A45D 40/06 |
| 2002/0036214 | A1 * | 3/2002 | Rousselet | B65D 83/0011 222/391 |
| 2004/0159727 | A1 * | 8/2004 | Mueller | A47J 43/1025 241/169.1 |
| 2009/0321478 | A1 * | 12/2009 | Juteau | B65D 83/761 220/288 |
| 2011/0297704 | A1 | 12/2011 | Esteve et al. | |
| 2012/0039655 | A1 * | 2/2012 | Baines | A45D 40/04 401/68 |
| 2012/0064481 | A1 * | 3/2012 | Cannon | A61C 5/62 433/90 |
| 2012/0097712 | A1 | 4/2012 | Esteve et al. | |
| 2012/0231125 | A1 * | 9/2012 | Orel | B65D 65/463 426/115 |
| 2015/0336723 | A1 * | 11/2015 | Koennecke | B65D 51/2835 206/222 |
| 2015/0353241 | A1 * | 12/2015 | Glaser | B65D 55/02 53/476 |
| 2016/0000207 | A1 | 1/2016 | Ishida | |
| 2019/0248574 | A1 * | 8/2019 | Johanson | B05C 17/012 |

FOREIGN PATENT DOCUMENTS

| | | | |
|---|---|---|---|
| JP | S59-184707 U | 12/1984 | |
| JP | S62-155717 U | 10/1987 | |
| JP | H03-188820 | 8/1991 | |
| JP | 2000-325141 | 11/2000 | |
| JP | 2002-336041 | 11/2002 | |
| JP | 2005-103032 | 4/2005 | |
| JP | 3120468 U | 4/2006 | |
| JP | 2012-111525 | 6/2012 | |
| JP | 2016-015984 | 2/2016 | |
| JP | 2021062130 A * | 10/2020 | ............. A45D 33/22 |
| JP | 2021017249 A * | 2/2021 | ............. B65D 43/28 |

OTHER PUBLICATIONS

International Search Report for PCT/JP2019/040918 mailed on Dec. 17, 2019.

Office Action issued in Japanese Application No. 2020-553292, mailed Jan. 24, 2023.

Office Action issued in Japanese Application No. 2022-165108, mailed Nov. 15, 2022.

\* cited by examiner

FIG.11
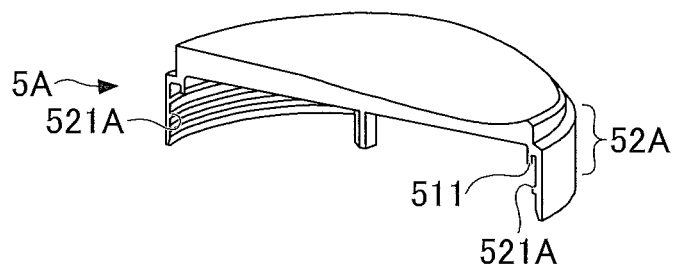
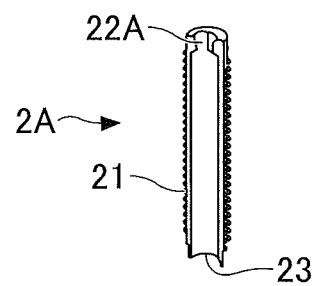
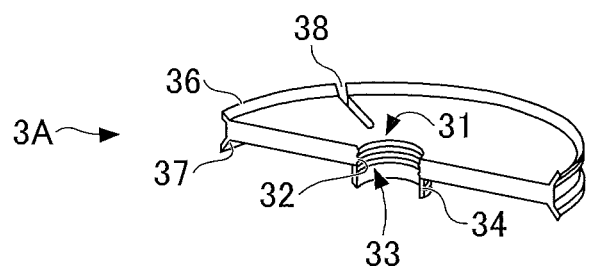
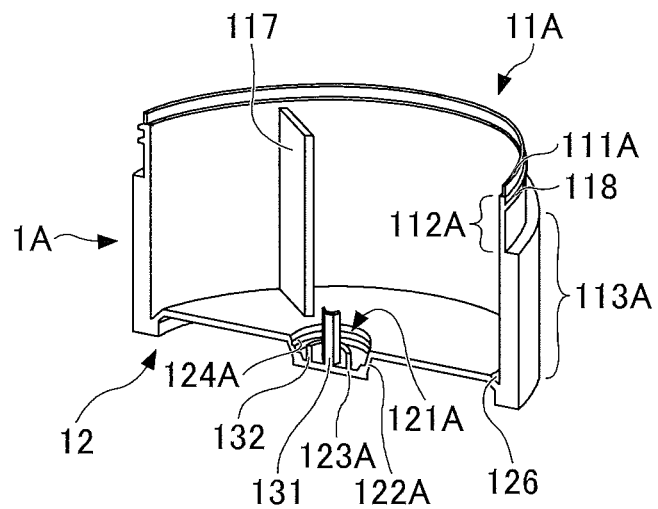

FIG.14
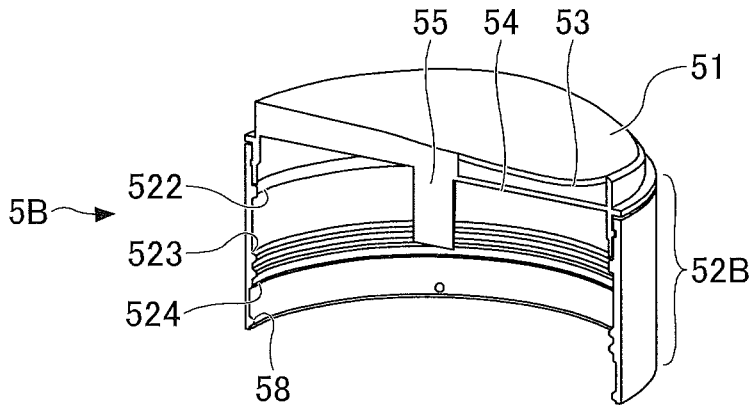
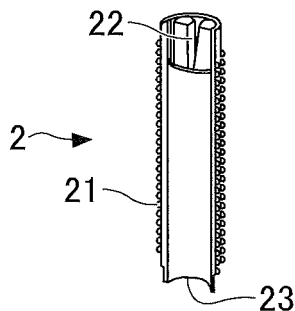
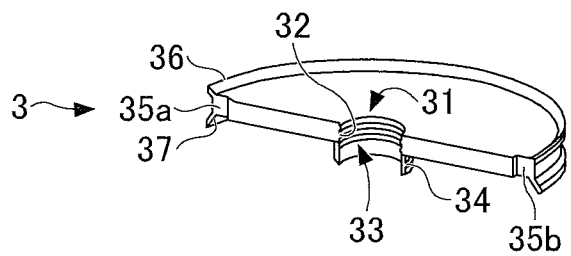
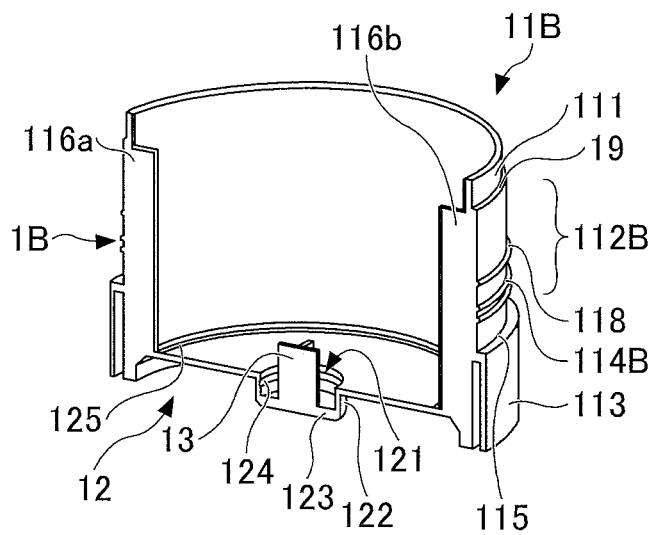

BEFORE USE

DURING USE

BEFORE USE

DURING USE

ENLARGED VIEW

FIG.23
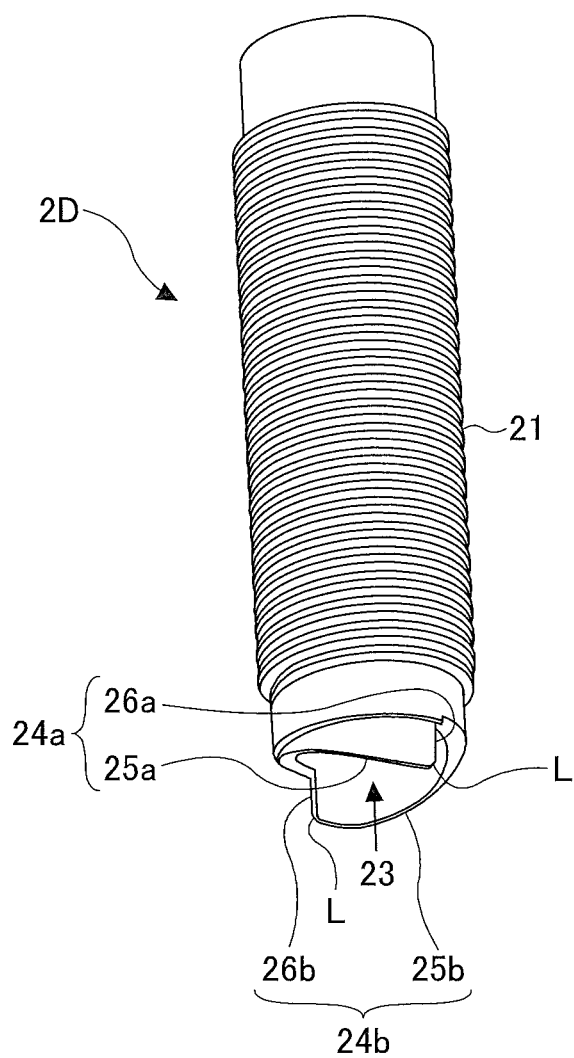
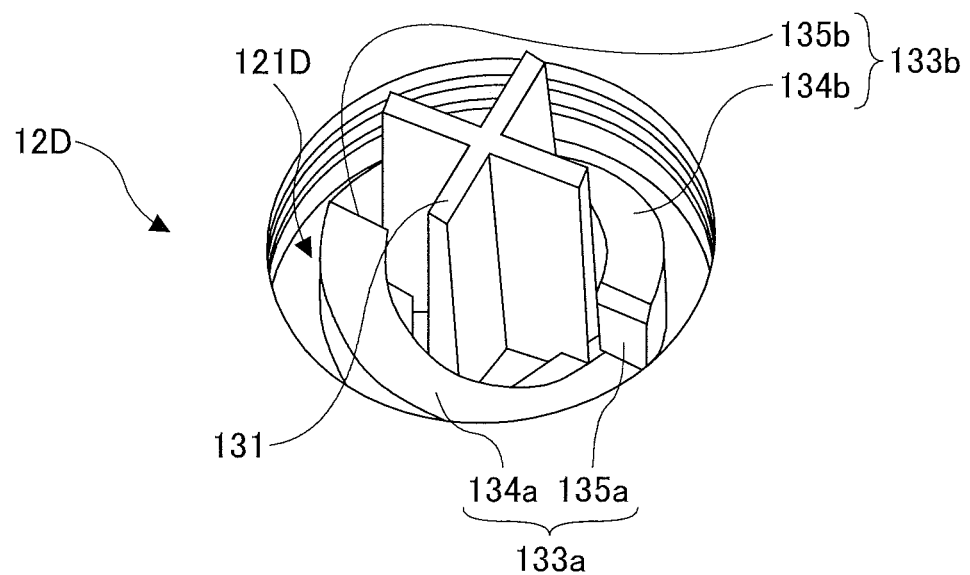

FIG.24
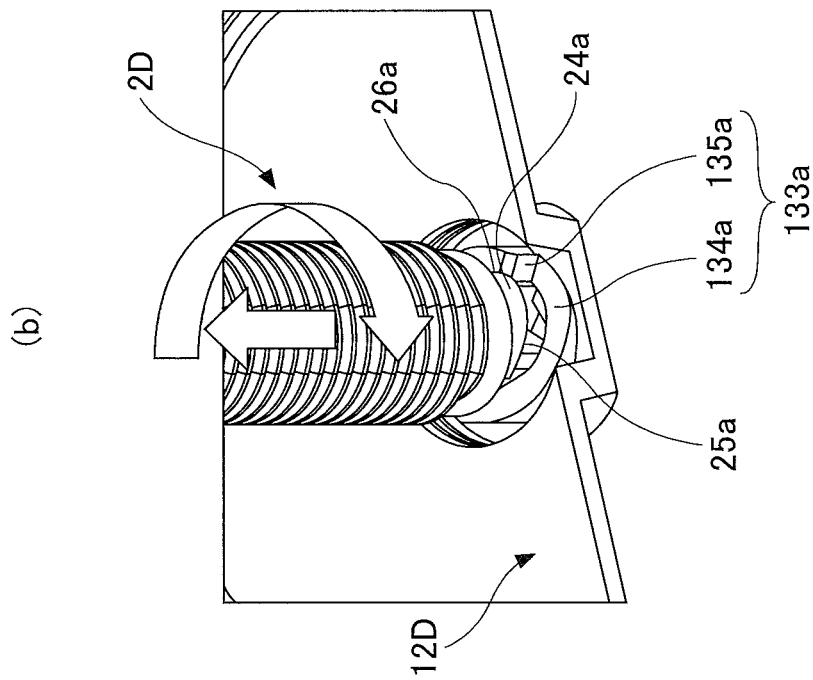
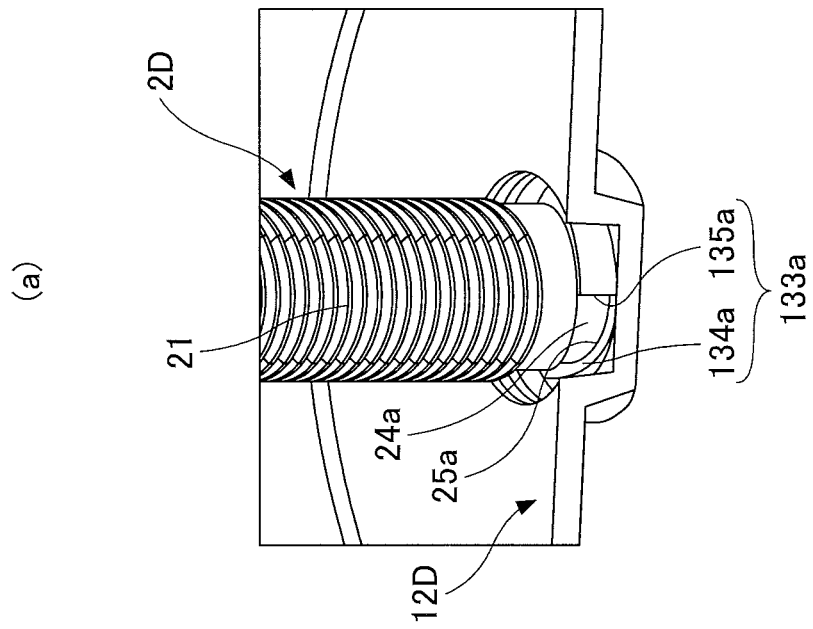

DISPENSING CONTAINER WITH CUTTER, SOLID MATERIAL CONTAINER, AND SOLID MATERIAL ROTARY CUTTING LID

TECHNICAL FIELD

The present invention relates to a dispensing container with a cutter, a solid material container, which serves as a refill for the dispensing container with the cutter, and a solid material rotary cutting lid, which is attachable to the solid material container.

BACKGROUND ART

Dispensing containers configured to dispense solid materials, preliminarily contained in the dispensing containers, are widely used. Further, dispensing containers with cutting functions to cut solid materials to appropriate sizes have been proposed.

For example, Patent Document 1 proposes a dispensing container with a cutting function. In the dispensing container, when a rotating lid having a cutter relatively rotates with respect to a container body, a helical rod rotates coaxially with the rotating lid, and a bottom plate that is engaged with the helical rod is raised with respect to the helical rod.

RELATED-ART DOCUMENTS

Patent Documents

Patent Document 1: Japanese Registered Utility Model No. 3120468

SUMMARY OF THE INVENTION

Problem to be Solved by the Invention

The above-described dispensing container is preassembled before being put on the market, and a refill is not provided.

In view of the above, it is an object of the present invention to provide a dispensing container with a cutter, in which a storage part configured to contain a solid material can be used as a refill.

Means to Solve the Problem

In order to solve the above-described problem, according to an aspect of the present invention, a dispensing container with a cutter includes a storage part, a helical tube, a rotating lid, and a movable plate. The storage part has a tubular shape with an opening at a top and is configured to contain a solid material. The helical tube has a helical groove on an outer peripheral surface thereof, and is configured to be attached to a bottom surface of the storage part. The rotating lid is disposed to be horizontally rotatable and includes a top plate and a peripheral wall that is a side surface. The top plate is provided with the cutter on an underside thereof and has an outlet. The cutter is configured to cut the solid material into a thin piece, and the outlet is configured to discharge the cut thin piece of the solid material. The movable plate has a hole into which the helical tube is fitted, and is configured to be raised within the storage part in conjunction with rotation of the rotating lid. The top plate of the rotating lid has a fitting projection that extends downward to be inserted into an upper end of the helical tube so as to cause the helical tube to rotate together with the rotating lid.

Effects of the Invention

According to one aspect, a storage part of a dispensing container with a cutter can be used as a refill.

BRIEF DESCRIPTION OF THE DRAWINGS

FIG. 11 is an exploded cross-sectional view of the dispensing container with the cutter according to the second embodiment;

FIG. 14 is an exploded cross-sectional view of the dispensing container with the cutter according to the third embodiment;

FIG. 23 is a diagram illustrating a helical tube and a central recess of a storage part according to a modification of the present invention;

FIG. 24 is an enlarged view of the helical tube of FIG. 23, in which the position movement of the helical tube at the beginning of use is depicted;

MODE FOR CARRYING OUT THE INVENTION

Figure 1:
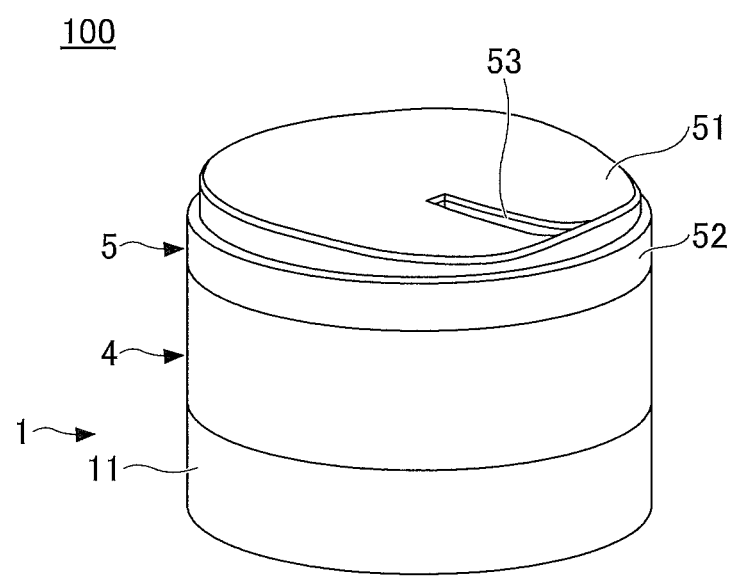
FIG. 1 is an external view of a dispensing container with a cutter according to a first embodiment of the present invention.

In the following, embodiments of the present invention will be described with reference to the accompanying drawings. In the drawings, the same elements are denoted by the same reference numerals and a duplicate description thereof may be omitted.

The present invention relates to a dispensing container with a cutter, a solid material container, which serves as a refill, and a solid material rotary cutting lid, which is attachable to the solid material container.

Examples of a solid material include solid cosmetics and semi-solid cosmetics such as hair cream with particularly high hardness, hair wax, and solid serums (such as serums with hardness similar to serum sticks), bar soap, and foods such as cheese and butter. In the present invention, the solid material is set by pre-filling a storage part with the solid material, replacing the storage part with a refill storage part, or filling the storage part with a replacement solid material.

First Embodiment

First, a dispensing container with a cutter according to a first embodiment of the present invention will be described with reference to FIG. 1 through FIG. 9B.

FIG. 1 is an external view of a dispensing container 100 with a cutter according to the first embodiment of the present invention.

In the present embodiment, the dispensing container 100 with the cutter includes a storage part 1, a helical tube 2 (see FIG. 2), a movable plate 3 (see FIG. 2), a tubular cover 4, and a rotating lid 5.

The storage part 1 is an open-top container (a container body or a storage container) having a tubular shape and containing a solid material.

The tubular cover 4 is a tubular member, serving as an outer cover (side cover), that covers a part of the outer peripheral surface of a peripheral wall 11 of the storage part 1.

The rotating lid 5 includes a top plate 51 and a peripheral wall 52 that is continuous with the outer periphery of the top plate 51. A slit 53 that extends approximately in the radial direction is formed in the top plate 51 of the rotating lid 5. Further, the peripheral wall 52 of the rotating lid 5 is attached to the upper end of a peripheral wall of the tubular cover 4 so as to be stably horizontally rotatable with respect to the tubular cover 4 without being separated.

Figure 2:
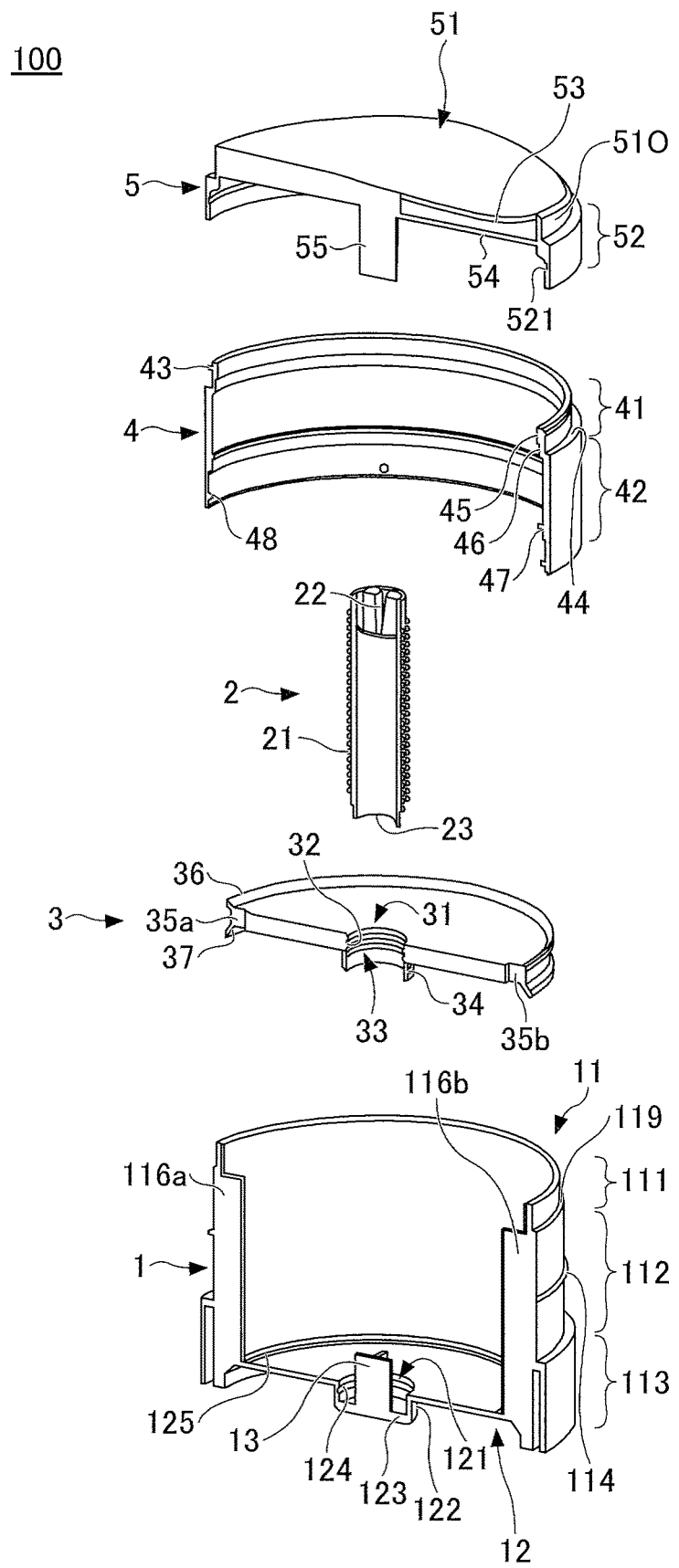
FIG. 2 is an exploded cross-sectional view of the dispensing container with the cutter according to the first embodiment.
Figure 3:
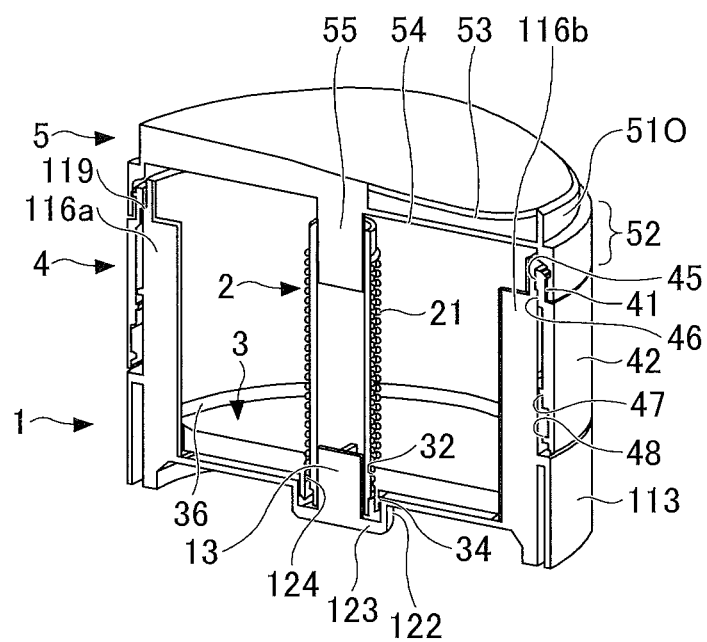
FIG. 3 is a cross-sectional perspective view of the dispensing container with the cutter according to the first embodiment.

FIG. 2 is an exploded cross-sectional view of the dispensing container 100 with the cutter according to the first embodiment. FIG. 3 is a cross-sectional perspective view of the dispensing container 100 with the cutter during use according to the first embodiment.

The storage part 1 has the peripheral wall 11, which is a side surface, and a bottom surface 12. The outer peripheral surface of the peripheral wall 11 is constituted by a thin upper portion 111, a central tube portion 112, and a double-walled lower portion 113 in this order from the top. Further, the central tube portion 112 is provided with an outer peripheral thread projection 114, which is a helical projection of more than one turn. In the peripheral wall 11, the thin upper portion 111 is thinner than the lower-side central tube portion 112, and the diameter of the outer peripheral surface of the thin upper portion 111 is thus smaller than the diameter of the outer peripheral surface of the central tube portion 112.

Referring to FIG. 2 and FIG. 3, in the assembled state, the thin upper portion 111 and the central tube portion 112, located on the upper side of the peripheral wall 11 of the storage part 1, are covered by the tubular cover 4 from the outer peripheral side, and the double-walled lower portion 113, located on the lower side of the peripheral wall 11, is not covered by the tubular cover 4.

The double-walled lower portion 113 protrudes in an inverted L-shape from the peripheral wall, which includes the central tube portion 112. In the assembled state, the lower end of the tubular cover 4 is located above the upper end of the double-walled lower portion 113.

Figure 4:
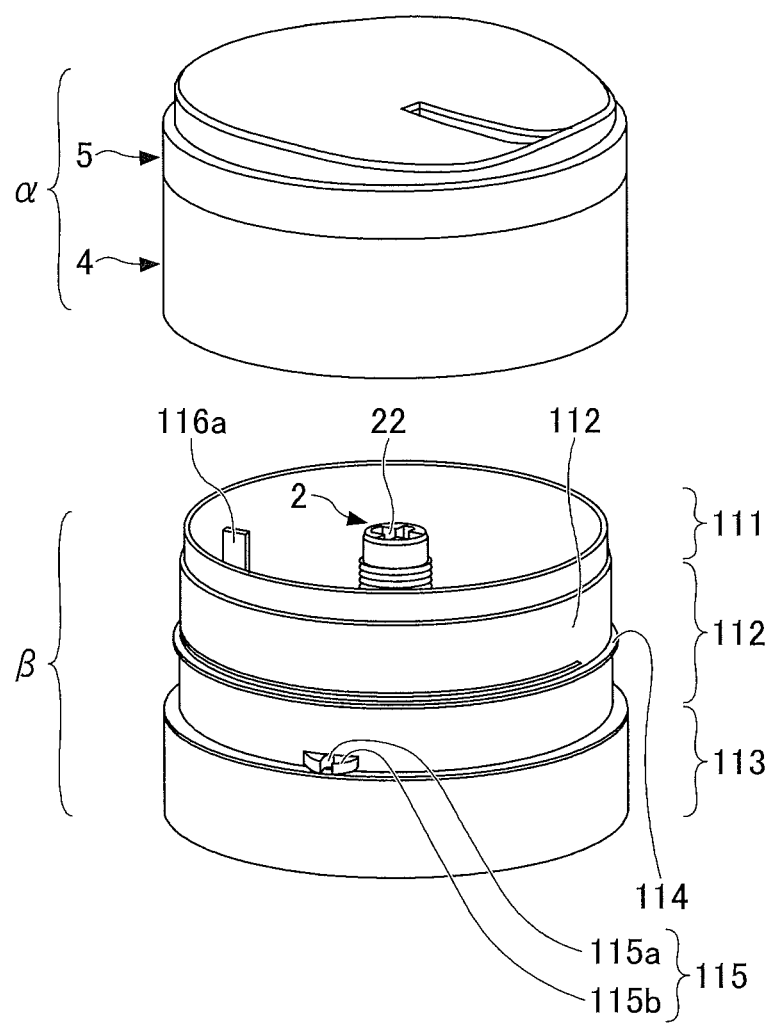
FIG. 4 is a diagram illustrating the dispensing container with the cutter according to the first embodiment that is disassembled into a lid unit and a refill.

Referring to FIG. 4, one or more fitting portions 115 are provided on the outer peripheral surface of the central tube portion 112 that is connected to the upper surface of the double-walled lower portion 113. The fitting portions 115 each include a fitting groove 115a and a raised guide portion 115b. The raised guide portion 115b is raised outward from the outer peripheral surface of the central tube portion 112, and the fitting groove 115a is recessed with respect to the raised guide portion 115b.

Referring back to FIG. 2, two inner ribs 116a and 116b that extend vertically and project inwardly are provided on the inner peripheral surface of the peripheral wall 11 of the storage part 1. The inner ribs 116a and 116b are examples of a rotation prevention function (stopper) for stopping the rotation of the movable plate 3. In the example illustrated in FIG. 2, the two inner ribs 116a and 116b are provided on the inner peripheral surface of the peripheral wall 11. However, any number of inner ribs, such as one or three or more inner ribs, may be provided.

A central recess 121, which is a circular recess, is formed in the center of the bottom surface 12 of the storage part 1. The central recess 121 has a side surface 122 and a lower surface 123, and an inner peripheral projection 124 is formed on the inner peripheral surface of the side surface 122. The inner peripheral projection 124 is an annular projection that is formed around the inner peripheral surface of the side surface 122 and extends by the same distance inward.

A cross-shaped support projection 13 is provided at the center of the central recess 121, which is at the center of the bottom surface 12.

Further, a ring-shaped projection 125 which is a projection having a ring shape and extending upward, is formed following the outer periphery of the bottom surface 12 and in the vicinity of the outer peripheral edge of the bottom surface 12.

The helical tube 2 is an axial tubular portion located at the center and extending in the vertical direction. A helical groove 21 is formed on the outer peripheral surface of the helical tube 2. A cross-shaped groove (cross-shaped hole) 22 is formed in the upper end portion of the helical tube 2. A cross-shaped fitting projection 55 of the rotating lid 5 is inserted into the cross-shaped groove 22 so as to be fitted into the cross-shaped groove 22 during use.

Note that, in the example illustrated in FIG. 2, the cross-shaped groove 22 is formed in the upper end portion of the helical tube 2; however, a groove formed in the upper end portion of the helical tube 2 may have any shape, as long as the groove can be formed in the helical tube 2 and function for rotation prevention. For example, the shape of the groove 22 formed in the upper end portion of the helical tube 2 may be a polygonal shape such as a square shape or a five-sided shape, a shape such as a pentagram or a hexagram, a shape such as a circle with a line, or a gear shape with a jagged edge, and the like.

A hollow portion 23 is formed in a lower end portion of the helical tube 2. The hollow portion 23 of the helical tube 2 is cylindrically hollow, and the support projection 13 of the storage part 1 is inserted into the hollow portion 23.

In the assembled state illustrated in FIG. 3, the cross-shaped fitting projection 55 of the rotating lid 5 is fitted into the cross-shaped groove 22 formed in the upper end portion of the helical tube 2. Therefore, when the rotating lid 5 rotates with respect to the tubular cover 4, the helical tube 2 rotates together with the rotating lid 5.

The hollow portion 23 in the lower end portion of the helical tube 2 contacts the cross-shaped support projection 13 on the bottom surface 12 of the storage part 1 without engaging with the cross-shaped support projection 13. Accordingly, when the helical tube 2 rotates together with the rotating lid 5, the hollow portion 23 in the lower end portion of the helical tube 2 rotates around the support projection 13. The upright state of the helical tube 2 is maintained by the support projection 13 of the storage part 1.

The movable plate 3 is configured to be raised within the storage part 1 in conjunction with the rotation of the rotating lid 5. A hole 31 is formed vertically through the center of the movable plate 3, and a helical projection 32 is formed on the inner peripheral surface of the hole 31. The helical projection 32 formed on the inner peripheral surface of the hole 31 of the movable plate 3 engages the helical groove 21 of the helical tube 2.

Further, the movable plate 3 includes a collar portion 33 that is continuous with the inner peripheral surface of the hole 31 and extends downward below the lower surface of the movable plate 3 in a circumferential manner. An outer peripheral projection 34 is formed on the outer periphery of the collar portion 33.

Two slits 35a and 35b are formed at the outer peripheral edge of the movable plate 3, and the two inner ribs 116a and 116b of the peripheral wall 11 of the storage part 1 are inserted into the slits 35a and 35b, respectively.

The engagement of the slits 35a and 35b with the inner ribs 116a and 116b prevents the rotation of the movable plate 3, and the movement in the rotation direction of the movable plate 3 with respect to the storage part 1 is restricted.

As described, the rotation of the movable plate 3 is restricted by the slits 35a and 35b, and the helical projection 32 of the movable plate 3 engages the helical groove 21 of the helical tube 2. In this state, when the helical tube 2 rotates, because the helical projection 32 engages the helical groove 21, the movable plate 3 is raised with respect to the helical tube 2. That is, the movable plate 3 can be raised within the storage part 1 in conjunction with the rotation of the rotating lid 5. Further, when the rotating lid 5 rotates in the reverse direction, the movable plate 3 moves down.

In the dispensing container 100 with the cutter according to the present invention, the movable plate 3 is raised within the storage part 1, thereby allowing the solid material contained in the storage part 1 to be dispensed until the end by using the cutter 54, even when the amount of the solid material is reduced.

The outer peripheral edge of the upper surface of the movable plate 3 is inclined upward, and the outer peripheral edge of the lower surface of the movable plate 3 is inclined downward. An inclined upper edge 36 of the upper surface of the movable plate 3 and an inclined lower edge 37 of the lower surface of the movable plate 3 contact the inner peripheral surface of the peripheral wall 11 of the storage part 1. Because the bottom surface of the solid material that is the contents is gradually raised from the outer edge when the movable plate 3 is raised, the inclined upper edge 36 being inclined upward can prevent the solid material (contents) from adhering to and remaining on the inner peripheral surface of the peripheral wall 11 of the storage part 1.

Because the inclined lower edge 37 of the lower surface of the movable plate 3 is inclined downward, the lower surface of the inclined lower edge 37 contacts the ring-shaped projection 125 of the bottom surface 12 of the storage part 1 before use. Accordingly, the lower surface other than the inclined lower edge 37 of the movable plate 3 does not contact the upper surface of the storage part 1. Thus, the movable plate 3 can be smoothly raised during use without adhering to the bottom surface 12 of the storage part 1. Further, when the storage part 1 is filled with a liquid before solidifying into the solid material, the inclined upper and lower edges 36 and 37 can prevent the liquid from entering a space between the movable plate 3 and the peripheral wall 11 of the storage part 1. Accordingly, waste of the contents can be eliminated.

Further, the outer periphery of the ring-shaped projection 125 on the bottom surface 12 is inclined downward. When the movable plate 3 is attached to the storage part 1 in a manufacturing process, the outer peripheral projection 34 on the outer periphery of the collar portion 33 of the movable plate 3 provisionally engages the inner peripheral projection 124 of the storage part 1, with the outer periphery of the ring-shaped projection 125 being in contact with the inclined lower edge 37 of the lower surface of the movable plate 3. This provisional engagement prevents the vertical movement of the movable plate with respect to the storage part 1 when the helical tube 2 is attached to the movable plate 3 by turning the helical tube 2, thus facilitating the initial positioning.

The tubular cover 4 has a tubular shape. The upper end of the tubular cover 4 engages the rotating lid 5, and the inner peripheral surface of the tubular cover 4 covers a part of the outer peripheral surface of the storage part 1.

The outer peripheral surface of the tubular cover 4 is constituted by an upper small-diameter portion 41 and a tubular portion 42. Further, an annular projection 43 is formed on the outer peripheral surface of the upper small-diameter portion 41. The annular projection 43 is an annular projection that is formed around the outer peripheral surface of the upper small-diameter portion 41 and extends by the same distance outward.

In the assembled state, the outer peripheral side of the upper small-diameter portion 41 of the tubular cover 4 is covered by the peripheral wall 52 of the rotating lid 5. In other words, the lower end of the peripheral wall 52 of the rotating lid 5 is located above an outer step 44 of the tubular portion 42. The outer step 44 is the upper surface of the tubular portion 42, and has a larger diameter than that of the upper small-diameter portion 41.

The inner peripheral surface on the upper side of the tubular cover 4 is constituted by a thick upper portion 45 and a thin upper portion 46. Further, an inner peripheral thread projection 47, which is a helical projection of more than one turn, is formed on the lower side of the inner peripheral surface of the tubular cover 4.

Referring to FIG. 3, the thick upper portion 45 formed on the inner peripheral surface of the tubular cover 4 contacts the outer peripheral surface of the thin upper portion 111 of the peripheral wall 11 of the storage part 1. The thin upper portion 46 contacts the outer peripheral surface of the central tube portion 112 of the storage part 1. In the assembled state, the lower end of the thick upper portion 45 of the tubular cover 4 abuts an outer peripheral step 119 formed between the thin upper portion 111 and the central tube portion 112, and in this state, the lower limit position of the tubular cover 4 with respect to the storage part 1 is determined.

Further, on the inner peripheral side of the tubular portion 42 of the tubular cover 4, the inner peripheral thread projection 47 of the tubular cover 4 engages the outer peripheral thread projection 114 of the central tube portion 112 of the storage part 1. Specifically, one thread projection engages a groove between adjacent turns of the other helical projection. In this manner, the tubular cover 4 engages the storage part 1.

Further, four projections 48 (undercuts) are provided at lower end portions of the tubular cover 4. At the time of assembly, while engaging the inner peripheral thread projection 47 and outer peripheral thread projection 114, the tubular cover 4 is rotated with respect to the storage part 1 such that the tubular cover 4 is moved down. Then, the projections 48 move over the raised guide portions 115b on the outer peripheral surface of the double-walled lower portion 113 and engage the fitting grooves 115a (see FIG. 4). This engagement allows the lower end of the tubular cover 4 to be fixed to the upper surface of the double-walled lower portion 113 of the storage part 1 while being slightly spaced apart from the upper surface of the double-walled lower portion 113. Accordingly, when the rotating lid 5 rotates, the rotation of the storage part 1 with respect to the tubular cover 4 can be prevented.

The rotating lid 5 includes the top plate 51 and the peripheral wall 52. The diameter of an upper peripheral wall 51O that is connected to the top plate 51 is smaller than that of the outer peripheral surface of the peripheral wall 52. Thus, the rotating lid 5 has a stepped shape as viewed from the outer peripheral side.

The inner periphery of the peripheral wall 52 engages the outer peripheral surface of the tubular cover 4 such that the rotating lid 5 is freely rotatable with respect to the tubular cover 4. An inner annular groove 521, which is an annular recessed groove, is formed on the inner peripheral surface of the peripheral wall 52. The outer annular projection 43 of the tubular cover 4 engages the inner annular groove 521. The engagement of the outer annular projection 43 of the tubular cover 4 with the inner annular groove 521 of the rotating lid 5 allows the lower end of the peripheral wall 52 of the rotating lid 5 to be spaced apart from the outer step that is the upper surface of the tubular portion 42, with the peripheral wall 52 of the rotating lid 5 covering the upper small-diameter portion 41. Accordingly, the rotating lid 5 can be stably rotatable with respect to the tubular cover 4 without being separated.

In the present embodiment, the inner annular groove 521 is formed on the peripheral wall 52 of the rotating lid 5 and the outer annular projection 43 is formed on the tubular cover 4, as engagement portions that allow the rotating lid 5 to be rotatable with respect to the tubular cover 4. However, as engagement portions that allow the rotating lid 5 to be rotatable with respect to the tubular cover 4, an annular projection may be formed on the inner periphery of the peripheral wall 52 of the rotating lid 5, and an annular groove may be formed on the outer periphery of the tubular cover 4.

Alternatively, annular projections may be formed both on the inner periphery of the peripheral wall 52 of the rotating lid 5 and the outer periphery of the tubular cover 4. Then, at least a part of one of the annular projections of the rotating lid 5 and the tubular cover 4 may be formed of double projections, and the other annular projection may enter and engage a groove between the double projections. Alternatively, as will be later described in a third embodiment, the engagement of an annular projection with a step may allow the rotating lid 5 to be rotatable with respect to the tubular cover 4.

The above-described engagement portions allow the rotating lid 5 to be relatively rotatable with respect to the tubular cover 4. Accordingly, the user can take out the solid material cut into thin pieces by rotating the rotating lid 5 with respect to the tubular cover 4 or by rotating the tubular cover 4 with respect to the rotating lid 5.

Further, the slit 53 is formed through the upper and lower surfaces of the top plate 51 of the rotating lid 5, and extends from the center to the vicinity of the outer peripheral edge along the radius of the rotating lid 5. In addition, the cutter 54 configured to cut the solid material into thin pieces is provided below the slit 53 of the top plate 51.

Further, the cross-shaped fitting projection 55 that projects downward is provided at the center of the top plate 51. As described above, the cross-shaped fitting projection 55 engages the cross-shaped groove 22 formed in the upper end of the helical tube 2. Therefore, the helical tube 2 rotates together with the rotating lid 5.

Further, in the present embodiment, as illustrated in FIG. 3, the cutter 54 is not in contact with the upper end of the helical tube 2 in the assembled state.

When the rotating lid 5 having the above-described configuration rotates, the cutter 54 cuts the solid material into thin pieces, and the thin pieces of the solid material are discharged from the slit 53 that extends approximately in the radial direction. Note that the configurations of the cutter 54 and the slit 53 will be described later with reference to FIG. 5A through FIG. 8B.

FIG. 4 is a diagram illustrating the dispensing container 100 with the cutter according to the first embodiment that is disassembled into a lid unit and a refill.

As illustrated in FIG. 4, the storage part 1, the movable plate 3, and the helical tube 2 can be used as a refill (bottle body) that is replaceable together with the solid material and is attachable to a lid unit α that includes the tubular cover 4 and the rotating lid 5. In other words, when the storage part 1 becomes empty, the storage part 1, the movable plate 3, and the helical tube 2 can be replaced with a new refill β, having the same shape as the storage part 1, and can be attached to the lid unit α.

The upper end of a solid material container β, which is a refill, can be covered by a film. That is, the upper ends of the storage part 1 and the helical tube 2 can be covered by a film. Accordingly, the solid material container β, which is a refill, can be distributed as a single unit.

As illustrated in FIG. 4, the helical tube 2 is a tube having the cross-shaped groove 22, which is a groove with a rotation stop function, at the upper end thereof, and the upper end of the helical tube 2 is positioned lower than the upper end of the peripheral wall 11. With this configuration, if the upper end of the peripheral wall 11 strongly contacts the film and the upper end of the helical tube 2 contacts the film due to the loosening of the film, the load applied to the film will be small because the upper end of the helical tube 2 having the cross-shaped groove 22 can make surface contact with the film.

In a case where the refill β is attached to the solid material rotary cutting lid α, which is the lid unit, the inner peripheral thread projection 47 of the tubular cover 4 (lid unit side) is screwed onto the outer peripheral thread projection 114 of the central tube portion 112 of the storage part 1 (refill side).

Accordingly, the replacement refill β can be readily attached to the lid unit α. That is, the dispensing container 100 with the cutter can be readily assembled.

Alternatively, the solid material, which is the contents contained in the storage part 1, may be formed into a cylindrical shape having a hole so as to match the shape of the solid material container, covered by a film, and distributed as a refill. In this case, the user can set the refill into the solid material container disassembled as illustrated in FIG. 4. If the solid material is used as a refill, the entire dispensing container with the cutter can be reused. Thus, many parts of the dispensing container can be reused and plastic waste can be reduced.

Further, the lid unit α, which includes the tubular cover 4 and the rotating lid 5 and excludes the solid material container β of the dispensing container 100 with the cutter, may be distributed as a replacement rotary cutting lid. The replacement rotary cutting lid can be attached to the solid material container β, which is used as a refill.

For example, if the tubular cover 4 or the rotating lid 5 is damaged during use, but the solid material (contents) remains in the solid material container β, the solid material (contents) can be still used by replacing the lid unit α with a replacement lid unit (replacement rotary cutting lid).
(Configuration of Rotating Lid)

Figure 5A:
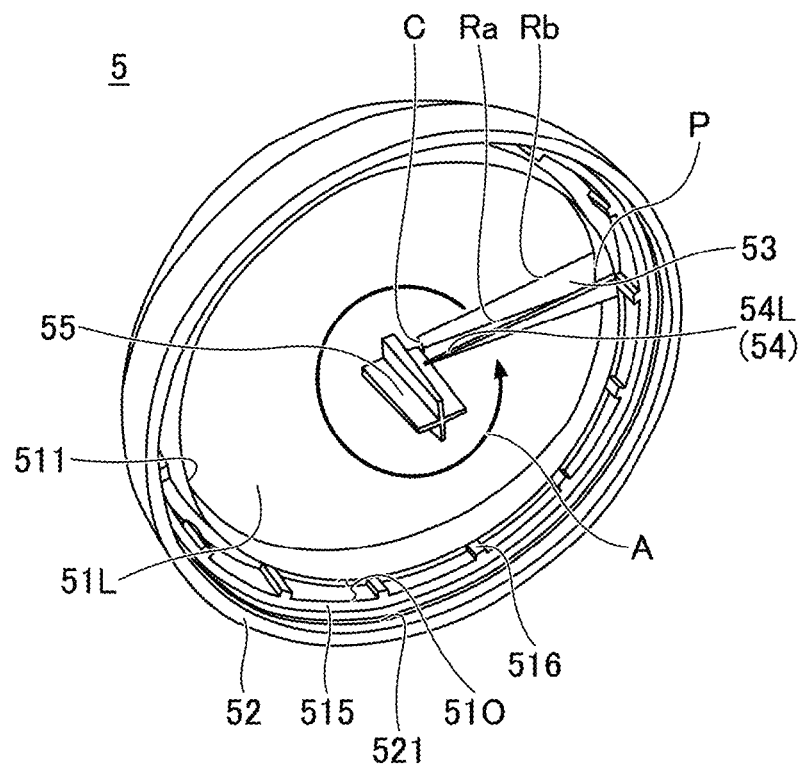
FIG. 5A is a perspective view of a rotating lid as viewed from the bottom according to the first embodiment.
Figure 5B:
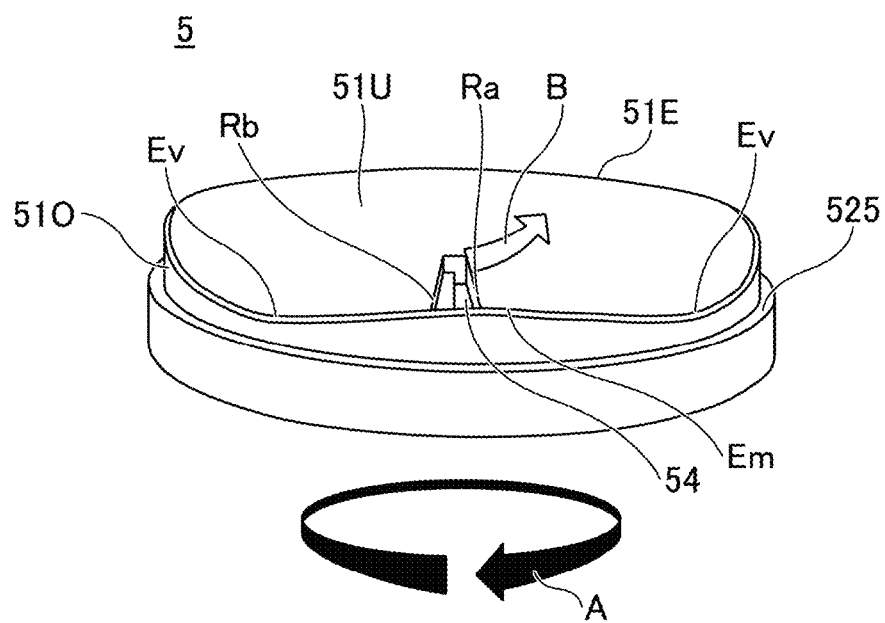
FIG. 5B is a perspective view of the rotating lid as viewed from the top according to the first embodiment.

FIG. 5A and FIG. 5B are perspective views of the rotating lid 5 according to the first embodiment. FIG. 5A is a perspective view of the rotating lid 5 as viewed from the bottom. FIG. 5B is a diagonal top view of the rotating lid 5 as viewed from a plane orthogonal to the slit 53.

As illustrated in FIG. 5A, the slit 53 is formed through the upper and lower surfaces of the top plate 51 of the rotating lid 5, and extends along the radius of the rotating lid 5 from the center to the outer peripheral edge. Further, the cross-shaped fitting projection 55 is formed at the center of a lower surface 51L of the top plate 51 of the rotating lid 5 so as to extend downward.

An inner peripheral ring 511 is annularly provided in the vicinity of the inner surface of the peripheral wall 52, which is the outer periphery edge of the rotating lid. The inner peripheral ring 511 extends downward from the lower surface 51L of the top plate 51.

As a part of the side surface of the rotating lid 5, the upper peripheral wall 51O is formed on the upper side of the upper surface 52S of the peripheral wall 52, and is connected to the top plate 51. The diameter of the upper peripheral wall 51O is smaller than that of the peripheral wall 52. Accordingly, as illustrated in FIG. 5A, there is a step 51S between the upper peripheral wall 51O and the peripheral wall 52 on the inner surface of the rotating lid 5. Linear ribs 516 are provided at predetermined intervals on the inner peripheral surface of the upper peripheral wall 51O.

The cutter 54 is formed integrally with the rotating lid 5. The cutter 54 is located below the top plate 51 of the rotating lid 5 and is specifically located below one edge of the slit 53. More specifically, the lower surface on the center side of the cutter 54 is connected to the fitting projection 55, and the lower surface on the periphery edge of the cutter 54 is positioned higher than that on the center side (that is, the lower surface on the periphery edge of the cutter 54 is positioned nearer to the top plate 51).

With the above configuration, the cutter 54 is formed so as to twist between the inner peripheral ring 511 of the lower surface 51L of the top plate 51 and the fitting projection 55.

Further, the slit 53 formed through the upper surface 51U of the top plate 51 is surrounded by radial edges Ra and Rb, an edge P, and an edge C. The radial edges Ra and Rb are located in the radial direction, the edge P is located on the outer edge side, and the edge C is located on the center side of the slit 53.

The cutter 54 is disposed below the slit 53 and extends downward from the radial edge Ra of the slit 53.

When the rotating lid 5 rotates in a direction indicated by an arrow A as illustrated in FIG. 5A, a lower edge 54L of the cutter 54 cuts the solid material into thin pieces, and the thin pieces of the solid material are discharged in a direction indicated by an arrow B of FIG. B.

Figure 6:
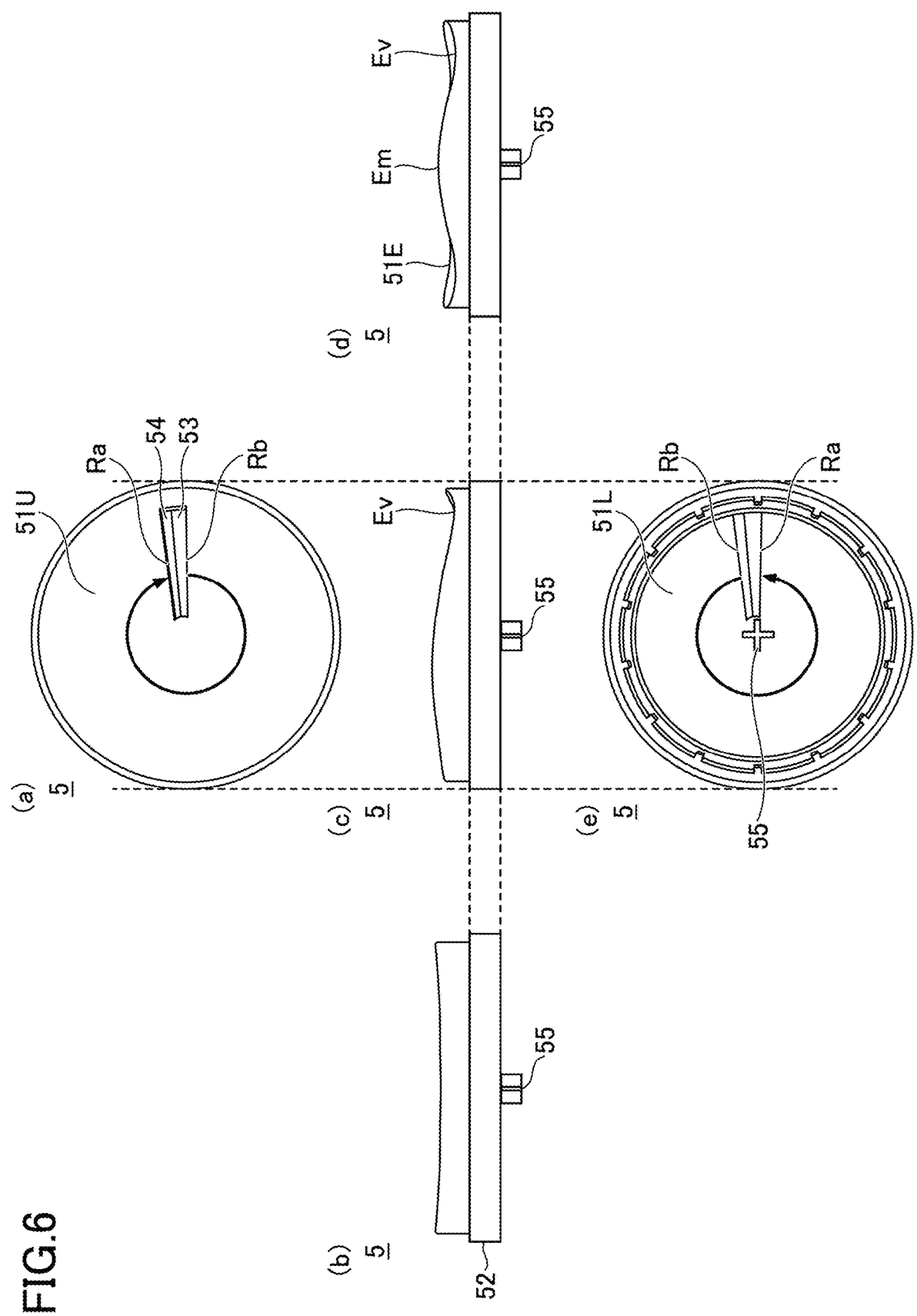
FIG. 6 is a diagram illustrating the rotating lid according to the first embodiment.

FIG. 6 is a diagram illustrating the rotating lid 5 according to the first embodiment. FIG. 6 (*a*) is a plan view, FIG. 6 (*b*) is a left side view, FIG. 6 (*c*) is a front view, FIG. 6 (*d*) is a right side view, and FIG. 6 (*e*) is a bottom view of the rotating lid 5.

Referring to FIG. 5A, FIG. 5B, and FIG. 6, the rotating lid 5 rotates such that the lower edge 54L of the cutter 54 contacts the contents at all times. That is, as illustrated in FIG. 6 (*a*), the user rotates the rotating lid 5 clockwise as viewed from above with respect to the tubular cover 4 so as to cut pieces of the contents. At this time, the rotating lid 5 rotates counterclockwise as viewed from the bottom as illustrated in FIG. 6 (*e*) and FIG. 5A.

As illustrated in FIG. 4, FIG. 5B, and FIG. 6, a periphery 51E of an upper surface 51U of the top plate 51 of the rotating lid 5 has a wave shape.

Further, the perimeter of the slit 53 of the rotating lid 5 rises so as to increase in height toward the outer peripheral side of the rotating lid 5. Specifically, in FIG. 5B, the periphery 51E of the upper surface 51U of the rotating lid 5 has a protruding shape Em in which the radial edge Ra of the slit 53, below which the cutter is provided, becomes the highest point.

Specifically, in the left side view of FIG. 6 (*b*), the periphery 51E, on the side farthest from the slit 53, of the upper surface 51U is configured to be gently recessed. In addition, in the right side view of FIG. 6 (*d*), the periphery 51E, on the side closest to the slit 53, of the upper surface 51U has the protruding shape Em in which the radial edge Rb on the upstream side in the rotation direction of the slit 53, below which the cutter is not provided, becomes the highest point.

In addition, as illustrated in the front views of FIG. 5B and FIG. 6 (C), portions of the periphery 51E in the vicinity of the slit 53 are symmetrically recessed (recessed portions EV).

The above-described shape of the upper surface is suitable for the user to scrape cut pieces of the solid material by sliding the finger from the center in a direction parallel to the extending direction of the slit 53.

Figure 7:
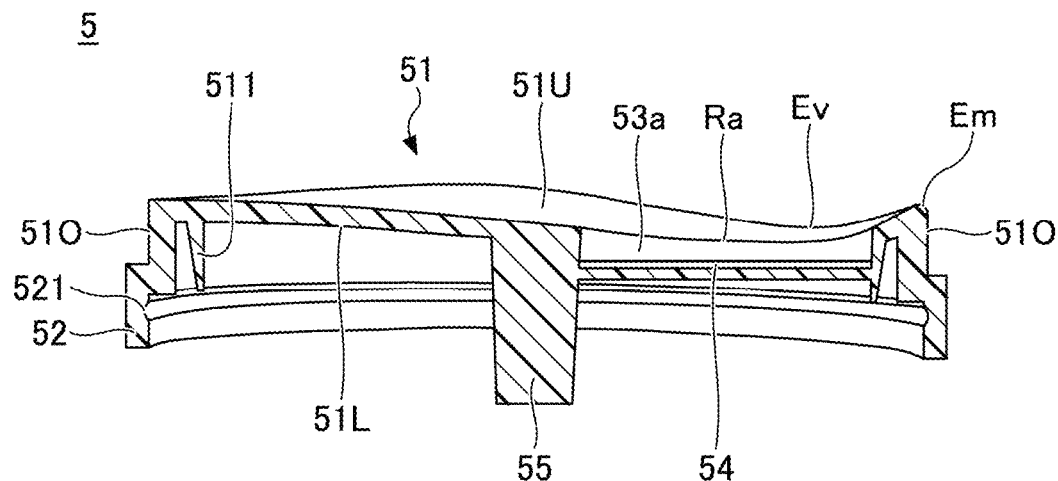
FIG. 7 is a cross-sectional view of the rotating lid 5 according to the first embodiment.

FIG. 7 is a cross-sectional view of the rotating lid 5 according to the first embodiment.

As illustrated in the cross-sectional view of FIG. 7, the vicinity of the slit 53 formed in the top plate 51 of the rotating lid 5 is recessed at the center and is then raised toward the outer periphery.

The above-described configuration is suitable for the user to scrape cut pieces of the solid material from the top plate 51 of the rotating lid 5 by moving the finger outward from the center along the extending direction of the slit 53 (C→P) or by sliding the finger across the radial edges Ra and Rb of the slid 53 in a direction perpendicular to the extending direction of the slit 53 (Ra→Rb or Rb→Ra).

Figure 8A:
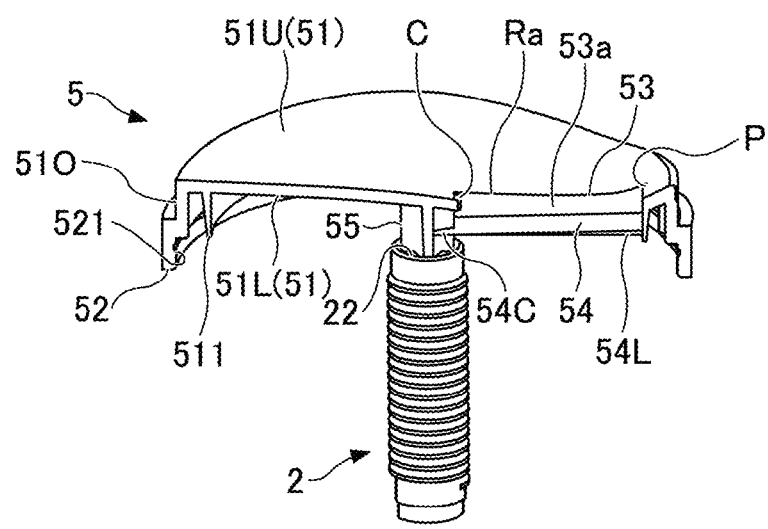
FIG. 8A is a cross-sectional side view of the rotating lid and a helical tube according to the first embodiment.
Figure 8B:
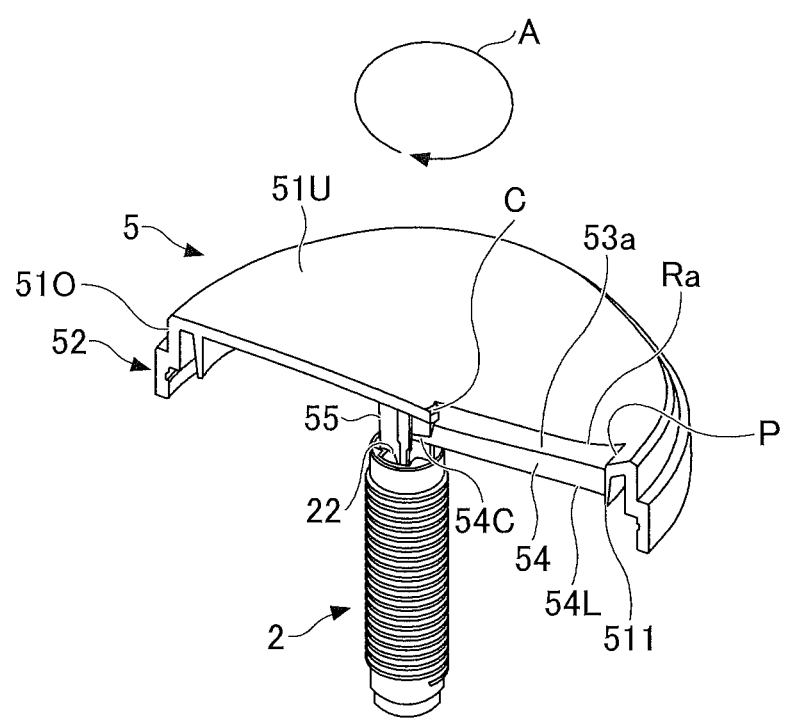
FIG. 8B is a cross-sectional perspective view of the rotating lid and the helical tube according to the first embodiment.

FIG. 8A and FIG. 8B are cross-sectional views of the rotating lid 5 and the helical tube 2 according to the first embodiment. FIG. 8A is a cross-sectional side view, and FIG. 8B is a cross-sectional perspective view.

As illustrated in FIG. 8A and FIG. 8B, in the present embodiment, the slit 53, which is an example of an outlet, extends in the radial direction of the top plate 51 of the rotating lid 5. The slit 53A has a connection surface 53*a* that extends downward, in the thickness direction of the top plate 51, from the radial edge Ra on the downstream side in the rotation direction of the rotating lid 5 during use. The upper edge of the cutter 54 extends from and is continuous with the slit 53 via the connection surface 53*a* and is inclined with respect to the connection surface 53*a*. Accordingly, the slit 53 and the cutter 54 have approximately the same length, and are formed to be continuous with each other.

An end portion 54C on the center side of the lower edge 54L of the cutter 54 is embedded into the cross-shaped fitting projection 55 provided at the center of the lower surface 51L of the top plate 51.

As described above, the cutter 54 and the slit 53 extend from the center of the rotating lid 5 to the inner peripheral ring 511, which is located near the outer peripheral edge of the top plate 51, in the radial direction of the rotating lid 5. Therefore, the cutter 54 and the slit 53 are arranged so as to cover approximately the entire radius of the upper surface of the solid material, which is the contents of the storage part 1.

Accordingly, when the solid material is cut into thin pieces by rotating the rotating lid 5 having the above-described configuration, the entire range of the upper surface of the contents of the storage part 1 can be cut by the rotation of the cutter 54 along with the rotation of the rotating lid 5, and the entirety of cut thin pieces can be discharged from the slit 53, having the same length as the cutter 54, and can be used by the user.

In the above-described example, the one slit 53 is formed in the rotating lid 5; however, two or more slits, which extend in the radial direction as illustrated in FIG. 8A and FIG. 8B, may be formed in the top plate of the rotating lid at predetermined intervals.

Further, in the present embodiment, as illustrated in FIG. 7, FIG. 8A, and FIG. 8B, the lower edge 54L of the cutter 54, which is formed so as to be continuous with the one edge Ra of the slit 53, extends approximately horizontally.

Figure 9A:
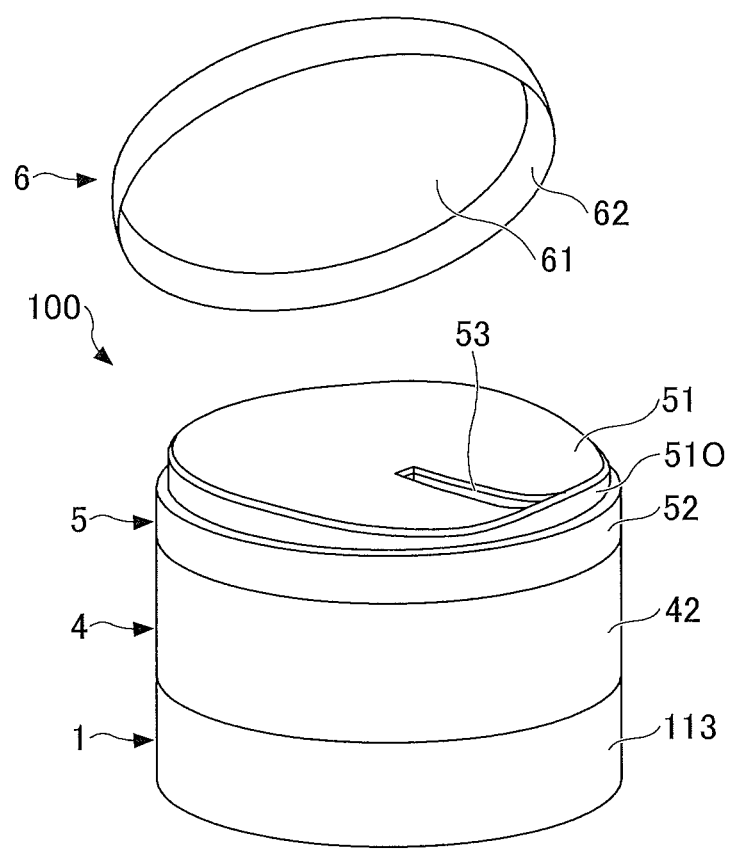
FIG. 9A is a diagram illustrating the dispensing container with the cutter according to the first embodiment from which a cap is removed.
Figure 9B:
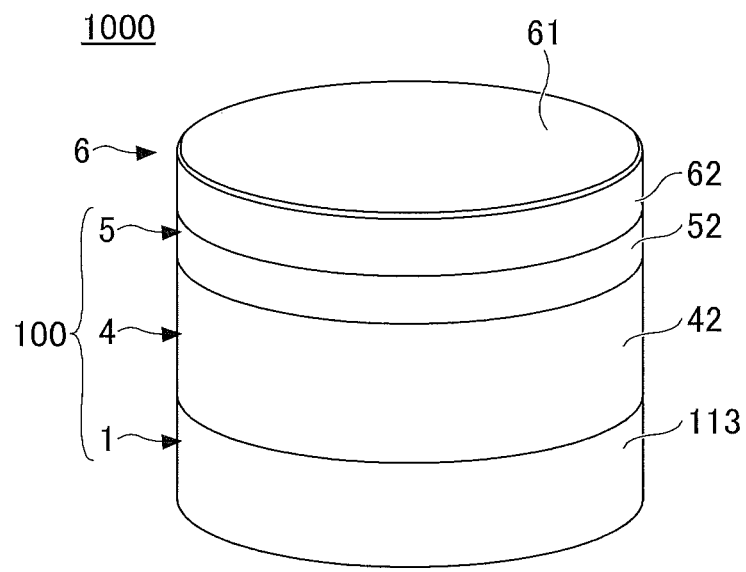
FIG. 9B is a diagram illustrating the dispensing container with the cutter according to the first embodiment to which the cap is attached.

FIGS. 9A and 9B are diagrams illustrating an example in which a cap 6 is attached to the dispensing container 100 with the cutter according to the first embodiment. The cap 6, which is an outer lid, may be attached to the dispensing container 100 with the cutter according to the first embodiment. FIG. 9A illustrates the dispensing container with the cutter, from which the cap 6 is removed. FIG. 9B illustrates the dispensing container with the cutter, to which the cap 6 is attached, which is depicted as a dispensing container 1000.

As illustrated in FIGS. 9A and 9B, the cap 6 has an upper wall 61 and a peripheral wall 62. The cap 6 is attached to the dispensing container 100 with the cutter from above the rotating lid 5, such that the top plate 51 and a part of the side surface of the rotating lid 5 are covered.

Specifically, the diameter of the side surface on the upper side of the rotating lid 5 is smaller than that on the lower side, and thus, the side surface of the rotating lid 5 has a stepped shape. Accordingly, in the state illustrated in FIG. 9B, the cap 6 is attached so as to cover the upper peripheral wall 51O, which is located on the upper surface 52S of the peripheral wall 52 and is connected to the top plate 51 of the rotating lid 5.

In the dispensing container 100 with the cutter according to the first embodiment, the solid material (contents) contained in the storage part 1 comes into contact with air through the slit 53. Thus, the attachment of the cap 6 can prevent the solid material from coming into contact with air and from drying.

Second Embodiment

Figure 10:
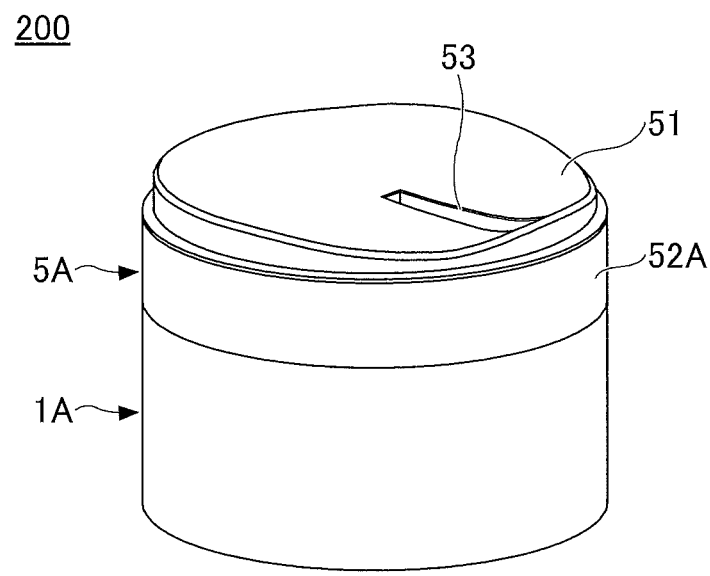
FIG. 10 is an external view of a dispensing container with a cutter according to a second embodiment of the present invention.

FIG. 10 is an external view of a dispensing container 200 with a cutter according to a second embodiment of the present invention.

The dispensing container 200 with the cutter according to the second embodiment differs from the first embodiment in that the tubular cover 4 is not provided. The shape of the top plate of a rotating lid 5A is approximately the same as that of the top plate of the first embodiment as illustrated in FIG. 4 through FIG. 7.

Figure 12:
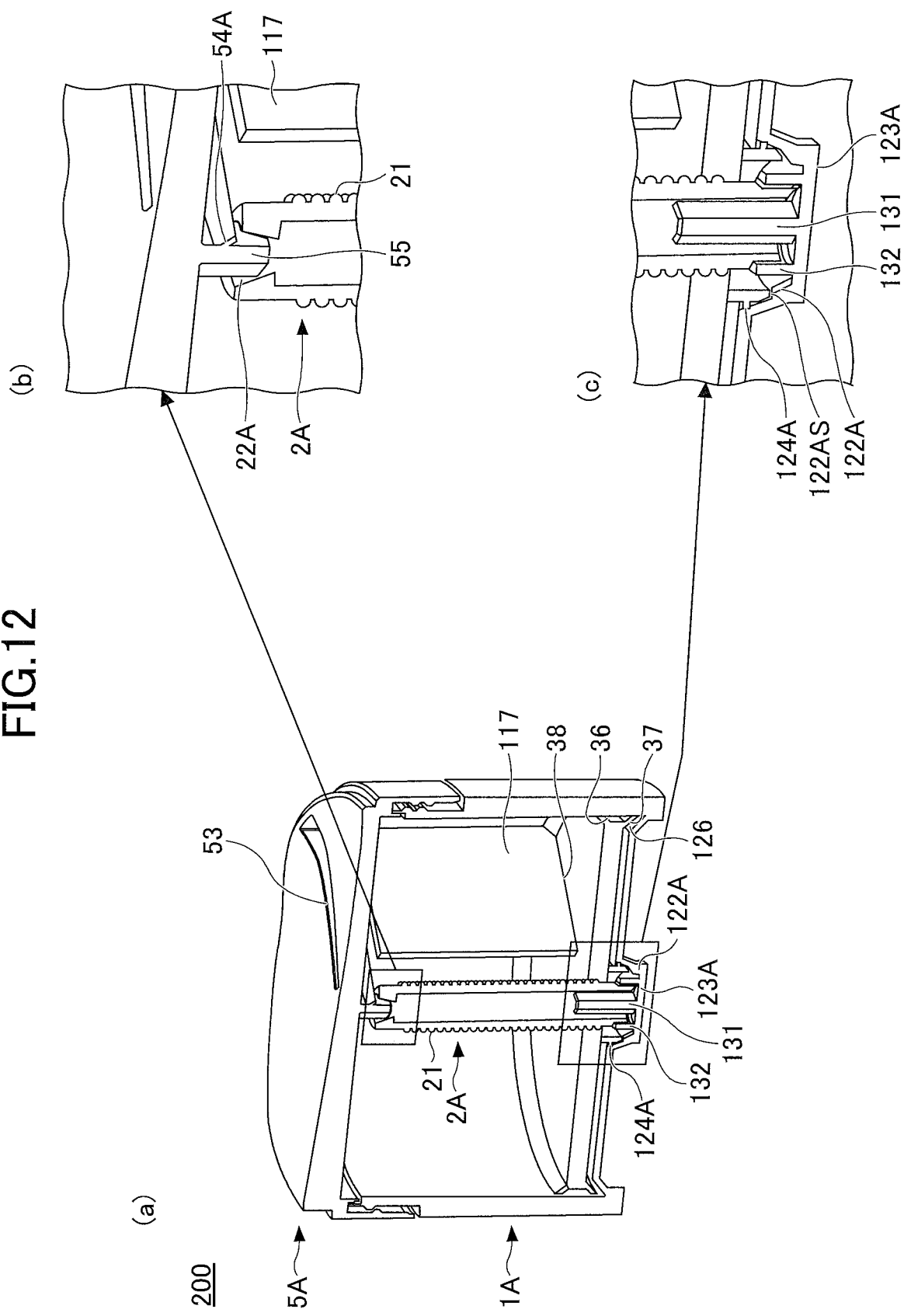
FIG. 12 is a cross-sectional perspective view of the dispensing container with the cutter during use according to the second embodiment.

FIG. 11 is an exploded cross-sectional view of the dispensing container 200 with the cutter according to the second embodiment. FIG. 12 is a cross-sectional perspective view of the dispensing container 200 with the cutter during use according to the second embodiment. Specifically, FIG. 12 (*a*) is a cross-sectional perspective view of the dispensing container 200 with the cutter during use, FIG. 12 (*b*) is an enlarged view of the vicinity of an upper end of a helical tube 2A of FIG. 12 (*a*), and FIG. 12 (*c*) is an enlarged view of the vicinity of a lower end of the helical tube 2A of FIG. 12 (*a*). In the following, differences from the first embodiment will be described, and a description of elements having the same configuration and functions will be omitted.

As illustrated in FIG. 11 and FIG. 12, the dispensing container 200 with the cutter according to the second embodiment includes a storage part (container body) 1A, the helical tube 2A, a movable plate 3A, and the rotating lid 5A.

In the present embodiment, the storage part 1A includes a stopper 117 for rotation prevention. The stopper 117 extends in the vertical direction and projects toward the center from the inner peripheral surface of a peripheral wall 11A of the storage part 1A in the radial direction.

The movable plate 3A has a linear slit 38 that extends in the radial direction of the movable plate 3A, and the stopper 117 is inserted into the slit 38. The slit 38 is longer than the slits 35*a* and 35*b* of the movable plate 3 of the first embodiment.

The tubular cover 4 is not provided in the second embodiment. Thus, an outer annular projection 118, which is an outer annular projection and is not a thread groove, is formed around the outer periphery of a central tube portion 112A and extends by the same distance outward. With this configuration, at least a part of the outer annular projection 118 is formed of double projections, and a space between the double projections is used as a groove. The central tube portion 112A according to the present embodiment is shorter than the central tube portion 112 according to the first embodiment.

Further, a peripheral wall 52A of the rotating lid 5A is longer than the peripheral wall 52 according to the first embodiment. An inner annular projection 521A is formed around the inner periphery of the peripheral wall 52A and extends by the same distance inward. With this configuration, at least a part of the inner annular projection 521A is formed of double projections, and a space between the double projections is used as a groove.

In the present embodiment, the outer annular projection 118 of the storage part 1A engages the groove between the double projections of the inner annular projection 521A of the rotating lid 5A, and the inner annular projection 521A of the rotating lid 5A engages the groove between the double projections of the outer annular projection 118 of the storage part 1A.

The engagement of the inner annular projection 521A of the rotating lid 5A with the outer annular projection 118 of the storage part 1A allows the rotating lid 5A to be stably rotatable with respect to the storage part 1A without being separated from the storage part 1A.

Further, in the present embodiment, the outer peripheral surface of a thin upper portion 111A is in the same plane of the outer peripheral surface of the central tube portion 112A, and the inner peripheral surface of the thin upper portion 111A is thinner than the inner peripheral surface of the central tube portion 112A.

As illustrated in FIG. 11 and FIG. 12 (*a*), the thin upper portion 111A is supported by being sandwiched between the inner peripheral ring 511 and the inner periphery of the peripheral wall 52A of the rotating lid 5A in the assembled state.

Further, in the present embodiment, for the purpose of ventilation, a thin cross-shaped support projection 131 and an outer annular projection 132 that surrounds the cross-shaped support projection 131 are provided in a central recess 121A in a bottom surface 12A of the storage part 1A. Further, a side surface 122A of the central recess 121A is inclined and has a step 122AS below an inner peripheral projection 124A. In the present embodiment, the lower end of a collar portion 33, which extends downward from a hole 31 of the movable plate 3A, is positioned on the step 122AS.

In the present embodiment, as illustrated in FIG. 12 (*a*) and FIG. 12 (*c*), the lower end of the helical tube 2A is supported by being sandwiched between the cross-shaped support projection 131 and the outer annular projection 132.

Further, in the present embodiment, the helical tube 2A contacts and is fitted to a portion to which a cutter 54A is connected. Therefore, a groove 22A, having an approximately cross shape and accommodating a cross-shaped fitting projection 55A and a part of the cutter 54A, is formed on the upper end of the helical tube 2A.

With the above-described configuration, as the part of the cutter 54A contacts the upper end of the helical tube 2A, air taken through the slit 53 can be conveyed from the top to the bottom of the helical tube 2A. Thus, efficient ventilation can be achieved in the dispensing container 200 with the cutter. Ventilation can prevent the creation of a vacuum in the lower part of the storage part 1A after the movable plate 3A is raised within the storage part 1A, thus preventing deformation of the storage part 1A.

Further, in the dispensing container 200 with the cutter according to the present embodiment, because the stopper 117 of the storage part 1A extends in the vertical direction, the upper end of the stopper 117 is located near the lower end of the cutter 54 when the rotating lid 5A rotates to the position depicted in FIG. 12 (*a*).

Accordingly, if a solid material adheres to the lower end of the cutter 54, the solid material adhering to the lower end of the cutter 54 is sandwiched between the cutter 54 and the stopper 117 and is removed from the cutter 54. Therefore, the clogging of the cutter 54 due to continuous use and the degradation of the cutting performance of the cutter 54 due to the adhesion of the solid material can be prevented.

Further, in the present embodiment, the storage part 1A and the rotating lid 5A do not have thread projections. Therefore, when the rotating lid 5A is attached to the storage part 1A, the peripheral wall of the rotating lid 5A is pressed from the top, such that the outer annular projection 118 engages the groove between the double projections of the inner annular projection 521A, and the inner annular projection 521A engages the double projections of the outer annular projection 118.

In the present embodiment, in the dispensing container that does not include the tubular cover 4, the one stopper 117, which prevents the rotation of the movable plate 3A and extends in the vertical direction, is provided. However, instead of the two inner ribs 116*a* and 116*b*, the one stopper 117, which extends in the vertical direction, may be provided in the dispensing container 100 that includes the tubular cover 4 according to the first embodiment.

Third Embodiment

Figure 13:
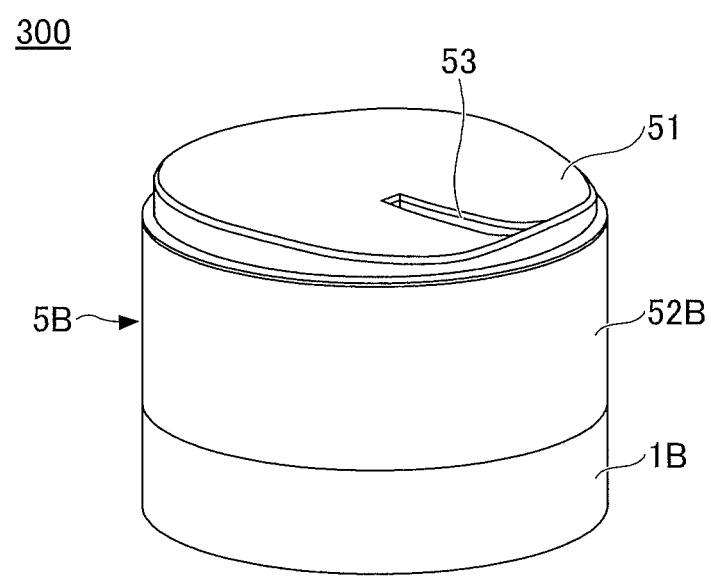
FIG. 13 is an external view of a dispensing container with a cutter according to a third embodiment of the present invention.

FIG. 13 is an external view of a dispensing container 300 with a cutter according to a third embodiment of the present invention. The dispensing container 300 with the cutter according to the third embodiment differs from the first embodiment in that the tubular cover 4 is not provided, and differs from the second embodiment in that a peripheral wall 52B of a rotating lid 5B extends downward farther than the peripheral wall 52A.

FIG. 14 is an exploded cross-sectional view of the dispensing container 300 with the cutter according to the third embodiment. As illustrated in FIG. 14, the dispensing container 300 with the cutter according to the present embodiment includes a storage part (container body) 1B, the helical tube 2, the movable plate 3, and a rotating lid 5B. In the present embodiment, the configurations of the helical tube 2 and the movable plate 3, the shape of the top plate 51 of the rotating lid 5B, and the shape of the bottom surface 12 of the storage part 1B are approximately the same as those of the first embodiment.

In the storage part 1B according to the present embodiment, a peripheral wall 11B is constituted by a thin upper portion 111, a central tube portion 112B, and a double-walled lower portion 113 as viewed from the outside of the storage part 1B. The central tube portion 112B according to the present embodiment is longer than the central tube portion 112A according to the second embodiment.

An outer peripheral thread projection 114B, which is a helical projection of more than one turn, is formed on the central tube portion 112B. In addition, the outer annular projection 118, which is a projection that extends annularly outward, is formed above the outer peripheral thread projection 114B.

In the rotating lid 5B, an upper step 522 is formed on the upper side of the inner surface of the peripheral wall 52B. The thickness on the lower side of the upper step 522 is smaller than that on the upper side, and thus, the diameter on the lower side of the upper step 522 is larger than that on the upper side. An inner thread projection 523, which is a helical projection of more than one turn, is formed below the upper step 522. In addition, a lower step 524 is formed below the inner thread projection 523, and the thickness on the lower side of the lower step 524 is smaller than that on the lower side.

Further, four projections 58 (undercuts) are provided at lower end portions of the inner peripheral surface of the rotating lid 5B.

Figure 15A:
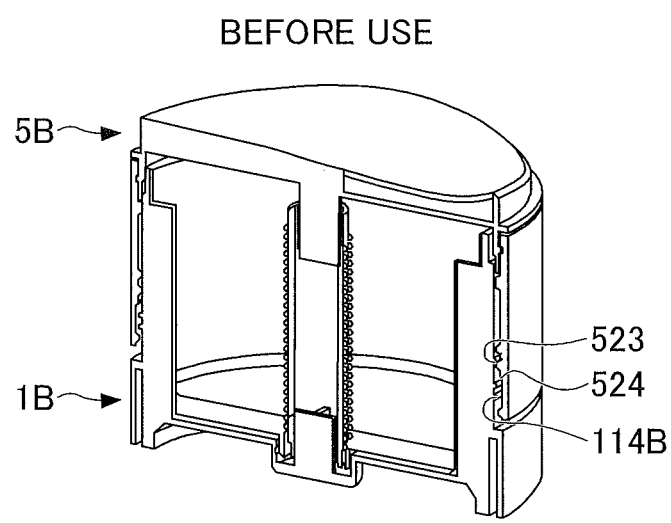
FIG. 15A is a cross-sectional perspective view of the dispensing container with the cutter before use according to the third embodiment.
Figure 15B:
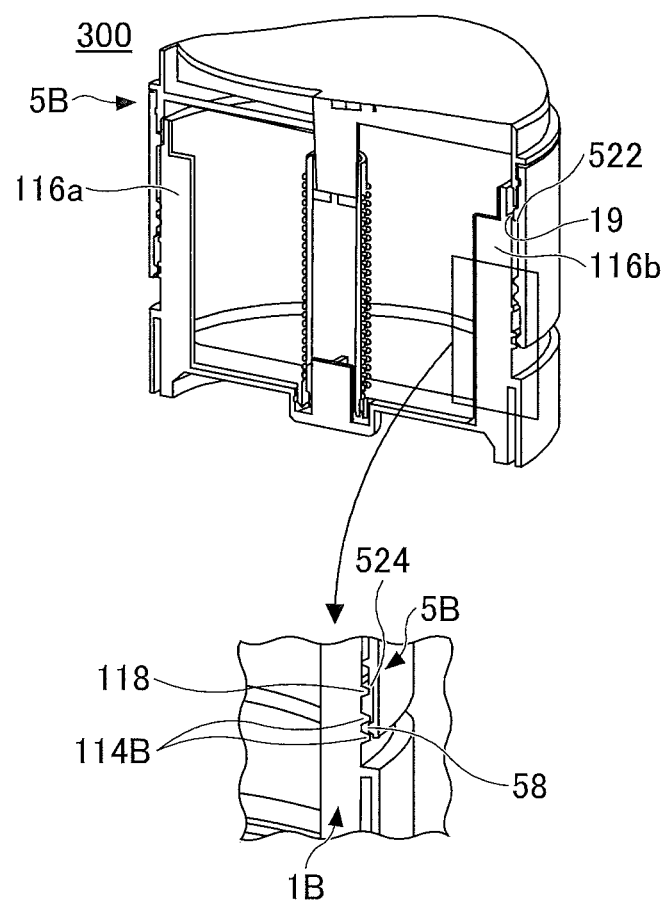
FIG. 15B is a cross-sectional perspective view of the dispensing container with the cutter during use according to the third embodiment.

FIG. 15A and FIG. 15B are cross-sectional perspective views of the dispensing container 300 with the cutter according to the third embodiment. Specifically, FIG. 15A is a cross-sectional perspective view of the dispensing container 300 with the cutter before use. FIG. 15B is a cross-sectional perspective view of the dispensing container 300 with the cutter during use. The lower side of FIG. 15B depicts an enlarged view of the rotating lid 5B and the storage part 1B during use.

In the present embodiment, the rotating lid 5B is located at the lowermost position before use as illustrated in FIG. 15A. In response to the rotation of the rotating lid 5B with respect to the storage part 1B in the use direction, the rotating lid 5B and the helical tube 2 are raised by a predetermined amount, become freely rotatable at a predetermined position illustrated in FIG. 15B, and used in the freely rotatable state until the end.

Specifically, in the present embodiment, in the state illustrated in FIG. 15A, the inner thread projection 523 of the rotating lid 5B engages the outer annular projection 118 of the storage part 1B, and the lower step 524 of the rotating lid 5B is positioned on the outer peripheral thread projection 114B of the central tube portion 112B.

As illustrated in FIG. 15B, when the rotating lid 5B becomes freely rotatable after being raised with respect to the storage part 1B along the threaded engagement, the upper step 522 on the inner periphery of the rotating lid 5B is positioned on an outer peripheral step 19 between the thin upper portion 111 and the central tube portion 112B. In this state, the rotating lid 5B becomes smaller in diameter as compared to the state illustrated in FIG. 15A, and the lower step 524 of the rotating lid 5B comes into contact with the upper surface of the outer annular projection 118 of the storage part 1B.

As described above, because the lower step 524 of the rotating lid 5B is positioned on the outer annular projection 118 of the storage part 1B, and the upper step 522 is positioned on the outer peripheral step 19 of the storage part 1B, the rotating lid 5B can be stably rotatable with respect to the storage part 1B without being separated from the storage part 1B.

Further, the four projections 58 are provided at the lower end portions of the rotating lid 5B. Thus, when the rotating lid 5B is raised during use, the projections 58 contact the outer peripheral thread projection 114B of the peripheral wall 11B of the storage part 1B. The projections 58 can prevent the rotating lid 5B from being excessively raised with respect to the storage part 1B.

In the state illustrated in FIG. 15B, the inner peripheral surface of the peripheral wall 52B of the rotating lid 5B engages the outer peripheral surface of the peripheral wall 11B of the storage part 1B such that the rotating lid 5B is freely rotatable with respect to the storage part 1B.

In the present embodiment, in order to assemble the dispensing container 300 with the cutter by attaching the rotating lid 5B to the storage part 1B, the peripheral wall 52B of the rotating lid 5B is pressed downward, and the rotating lid 5B is rotated until the lower step 524 of the rotating lid 5B is positioned on the outer peripheral thread projection 114B below the outer annular projection 118.

Fourth Embodiment

Figure 16:
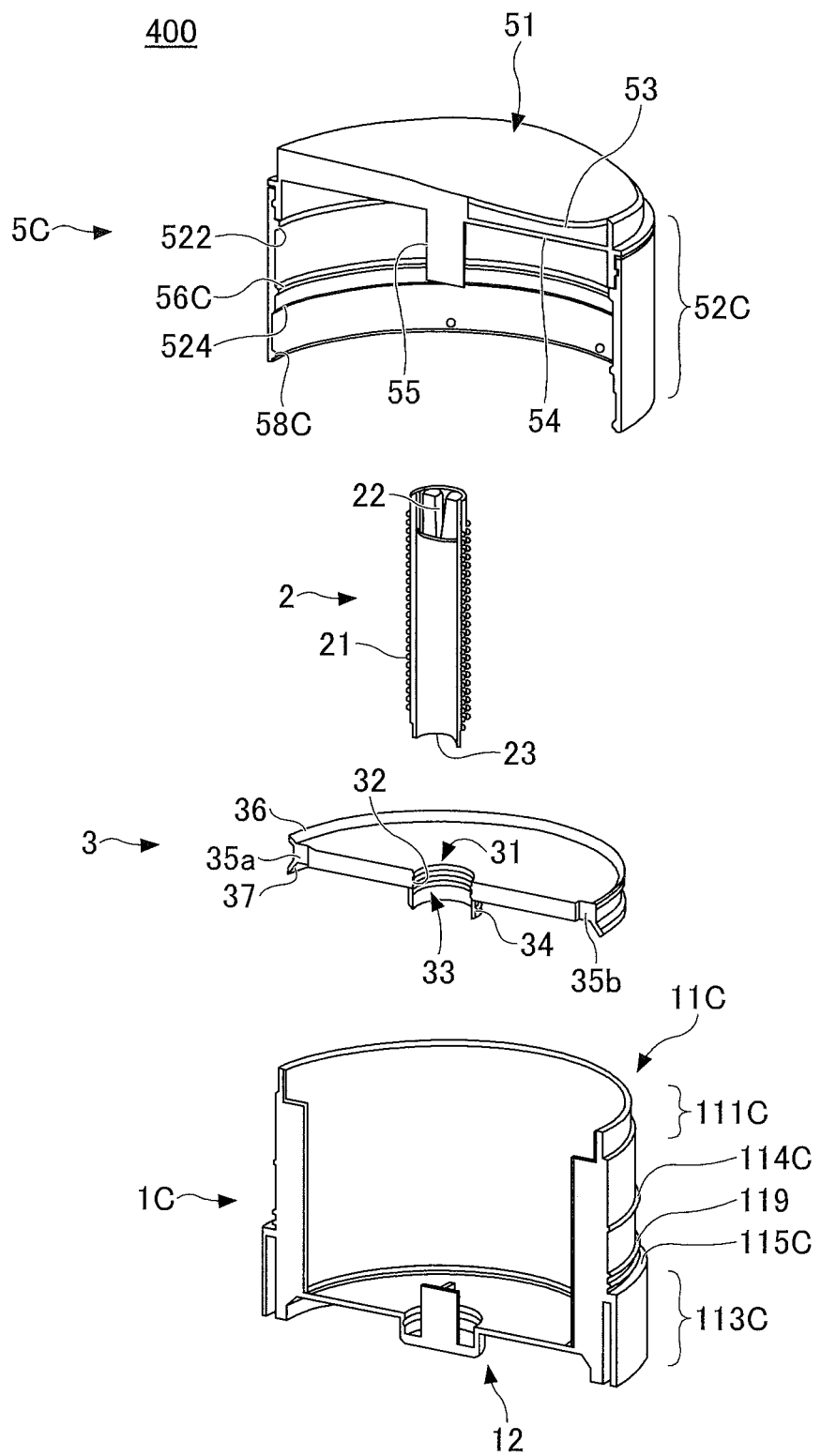
FIG. 16 is an exploded cross-sectional view of a dispensing container with a cutter according to a fourth embodiment of the present invention.

FIG. 16 is an exploded cross-sectional view of a dispensing container 400 with a cutter according to a fourth embodiment of the present invention. The external view of the dispensing container 400 with the cutter according to the fourth embodiment is approximately the same as that of the dispensing container 300 with the cutter according to the third embodiment, and is thus not depicted.

In the present embodiment, the configurations of the helical tube 2 and the movable plate 3, the shape of the top plate 51 of a rotating lid 5C, and the shape of the bottom surface 12 of a storage part 1C are approximately the same as those of the first embodiment.

In the storage part 1C according to the present embodiment, a peripheral wall 11C is constituted by a thin upper portion 111C, a central tube portion 112C, and a double-walled lower portion 113C as viewed from the outside of the storage part 1C. The central tube portion 112C according to the present embodiment is longer than the central tube portion 112A according to the second embodiment.

An outer peripheral thread projection 114C, which is a helical projection of more than one turn, is formed on the central tube portion 112C. In addition, outer double projections 119, which are double projections extending annularly outward, are formed below the outer peripheral thread projection 114C of the central tube portion 112C.

Further, a step 522 is formed on the inner surface of the peripheral wall 52C of the rotating lid 5C. An inner annular projection 56C, which is a projection that extends annularly inward, is formed below the step 522.

Further, four projections 58C (undercuts) are provided at the lower end portions of the inner surface of the peripheral wall 52C.

Figure 17A:
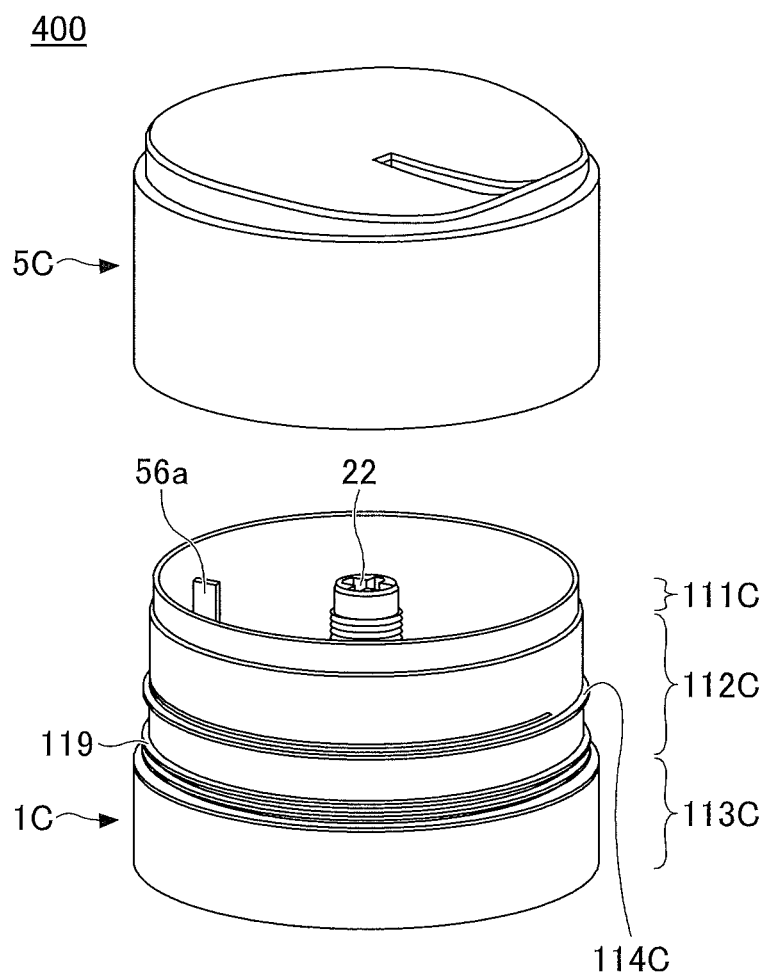
FIG. 17A is a cross-sectional perspective view of the dispensing container with the cutter before use according to the fourth embodiment.
Figure 17B:
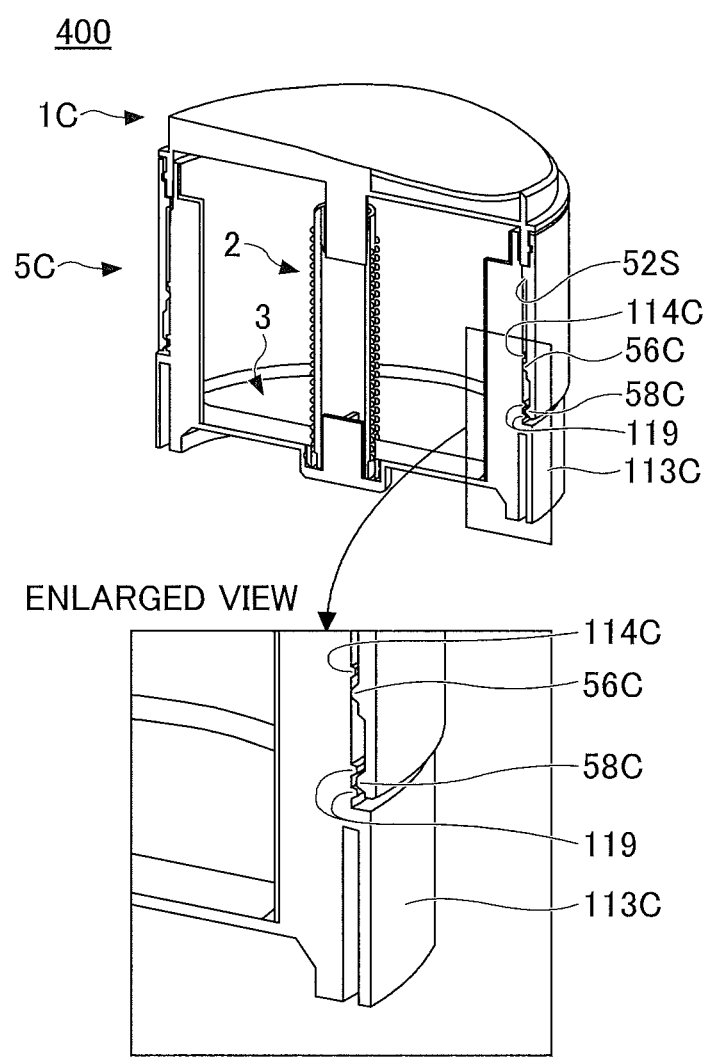
FIG. 17B is a cross-sectional perspective view of the dispensing container with the cutter during use according to the fourth embodiment.

FIGS. 17A and 17B are cross-sectional perspective views of the dispensing container 400 with the cutter according to the fourth embodiment. Specifically, FIG. 17A is a cross-sectional perspective view of the dispensing container 400 with the cutter before use. FIG. 17B is a cross-sectional perspective view of the dispensing container 400 with the cutter during use. The lower side of FIG. 17B depicts an enlarged view of the rotating lid 5C and the storage part 1C during use.

In the present embodiment, the dispensing container 400 with the cutter can be readily assembled. Therefore, the dispensing container 400 with the cutter can be stored in a disassembled state and assembled immediately before use, or can be disassembled after use each time as necessary, as illustrated in FIG. 16.

In response to the rotation of the rotating lid 5C with respect to the storage part 1C in the use direction, the rotating lid 5C is moved down by a predetermined amount, becomes freely rotatable at a predetermined position, and used in the freely rotatable state until the end.

In the present embodiment, in order to attach the rotating lid 5C to the storage part 1C, the rotating lid 5C is moved downward while being rotated. At this time, while the rotating lid 5C is moved downward, the inner annular projection 56C of the rotating lid 5C engages the outer peripheral thread projection 114C, and the downward movement of the rotating lid 5C is stopped when the projections 58C engage the double projections 119.

As illustrated in FIG. 17B, the inner peripheral surface of the peripheral wall 52C of the rotating lid 5C becomes freely rotatable with respect to the outer peripheral surface of the peripheral wall 11C of the storage part 1C, with the four projections 58C engaging the double projections 119 of the storage part 1C.

In the present embodiment, in order to assemble the dispensing container 400 with the cutter by attaching the rotating lid 5C to the storage part 1C, the thread projection and the thread groove are used to move the rotating lid 5C to a position where the rotating lid 5C becomes freely rotatable. Accordingly, the user can readily assemble the dispensing container 400 with the cutter with a light force, as compared to the second embodiment and the third embodiment.
<Other Configurations of Rotating Lid>

In the above-described first embodiment through the fourth embodiment, the one slit 53 is formed in the top plate of each of the rotating lids 5A, 5B, and 5C. However, two or more slits may be formed, and are not required to be linear. Although a plurality of rotating lids according to modifications will be described below, there are substantially no functional differences due to differences in the shapes of the rotating lids.
(Rotating Lid According to First Modification)

Figure 18:
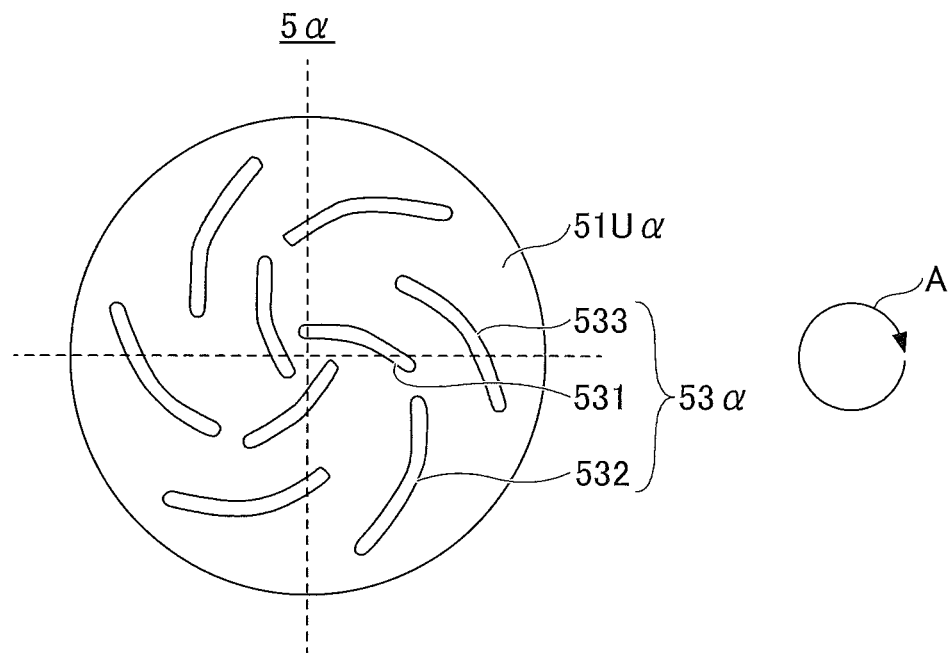
FIG. 18 is a plan view of a rotating lid according to a first modification of the present invention.

FIG. 18 is a plan view of a rotating lid according to a first modification of the present invention.

In the first modification, a plurality of groove-shaped slits 53α (531, 532, and 533) are formed in an upper surface 51Uα of a top plate of a rotating lid 5α.

Specifically, a slit 531 is formed on the side closer to the center of the upper surface 51Uα relative to a slit 532, and the slit 532 is slightly spaced apart from the slit 531. In this manner, slits 531 and slits 532 are formed at intervals of approximately 120 degrees. A slit 533 is formed between slits 531, 532 and adjacent slits 531, 532.

With the above-configuration, the plurality of curved slits 53α, consisting of the three types of slits 531, 532, and 533, are arranged so as to cover approximately the entire radius of the upper surface of the contents contained in the storage part 1 when the rotating lid 5α is rotated during use.

Although not illustrated, cutters (not illustrated) are provided so as to follow the edges, on the downstream side in a rotation direction A of the rotating lid 5α, of the slits 53α. In other words, the slits 53α are provided so as to follow the outer arcs of the curved slits 531, 532, and 533 that project toward the downstream side in the rotation direction A.

With the above-described configuration of the plurality of slits 53α and the cutters provided so as to follow the edges of the slits 53α, the upper surface of the contents of the storage part 1, located inward relative to the ends on the outer peripheral side of the slits 532 and 533, can be securely cut by the cutters that rotate together with the rotating lid 5α, without the contents remaining in the storage part 1.

Further, the plurality of groove-shaped slits 53α (531, 532, 533) and the cutters that follow the outer arcs of the slits 53α have strip shapes that are recessed toward the downstream side in the rotation direction (clockwise). Therefore, pieces of the contents cut by the cutters can be readily collected in the center of the recessed portions, thus allowing the user to readily collect the pieces of the contents.

With the above-described configuration, the plurality of groove-shaped slits 53α are formed in the upper surface 51Uα of the top plate of the rotating lid 5α. Therefore, the contents can be cut by rotating the rotating lid 5α by a small rotation angle such as 60°, instead of rotating the rotating lid 5α one turn.

However, in the rotating lid 5α, if the number of the slits 53α and the cutters connected to the slits increase, a complicated mold may be required for a manufacturing process such as injection molding. Therefore, the number and shape of the slits 53α and the cutters may be appropriately determined in accordance with the angle of rotation set for cutting the contents, mold costs, and the like.
(Rotating Lid Lid According to Second Modification)

Figure 19:
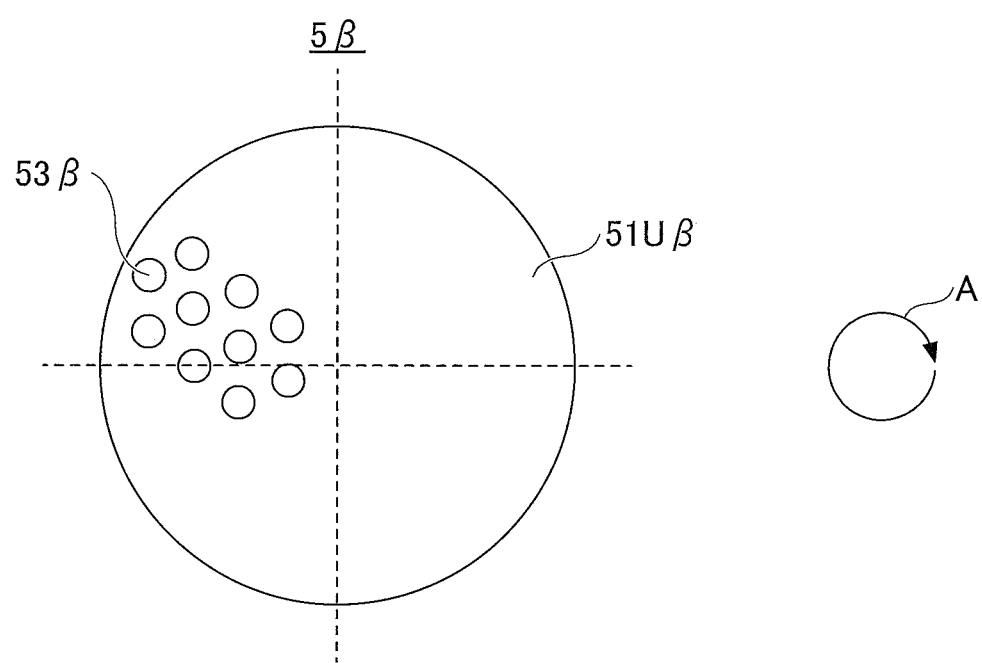
FIG. 19 is a plan view of a rotating lid according to a second modification of the present invention.

FIG. 19 is a plan view of a rotating lid according to a second modification of the present invention.

In the second modification, a plurality of circular holes 53β are formed in an upper surface 51Uβ of a top plate of a rotating lid 51β. The plurality of circular holes 53β are arranged in a staggered pattern within a certain angular range.

Although not illustrated, cutters are provided so as to follow the arcs, on the downstream side in the rotation direction of the rotating lid 51β, of the circular holes 53β, which are examples of an outlet.

The plurality of circular holes 53β are arranged in the staggered pattern such that approximately the entire radius of the upper surface of the contents contained in the storage part 1 is covered when the rotating lid 51β is rotated during use.

With the above configuration, each of the circular holes 53β has a smaller opening area than that of the slit 53 of the rotating lid 5 as illustrated in FIG. 8B. Accordingly, the circular holes 53β are suitable to cut the contents into small thin pieces. Note that the holes 53β, which are examples of an outlet, illustrated in FIG. 18 have circular shapes, but may have elliptical shapes.

The plan views of the rotating lids according to the first modification and the second modification illustrated in FIG. 18 and FIG. 19 are viewed from the top. For convenience, FIG. 18 and FIG. 19 depict the planar upper surfaces 51Uα and 51Uβ of the rotating lids 5α and 5β, but the upper surfaces 51Uα and 51Uβ may be curved as appropriate.

In each of the above-described embodiments and the first and second modifications, a slit or a circular hole, which is an example of an outlet, is formed in the upper surface of a top plate of a corresponding rotating lid. The periphery of the outlet formed in the top plate of the rotating lid may partially rise.

(Rotating Lid According to Third Modification)

Figure 20:
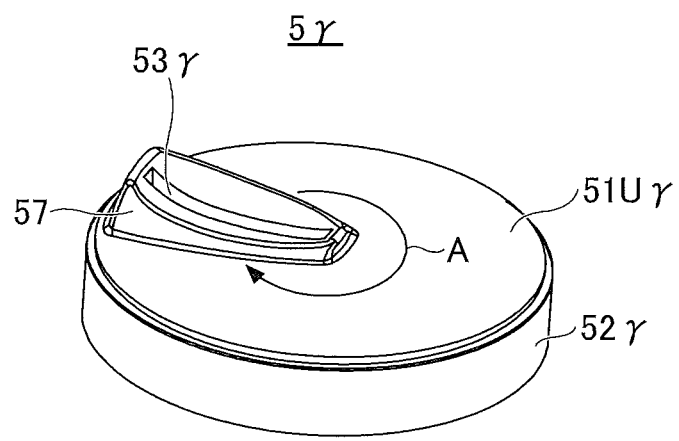
FIG. 20 is a perspective view of a rotating lid according to a third modification of the present invention.

FIG. 20 is a perspective view of a rotating lid according to a third modification of the present invention.

In the third modification, similar to the above-described first through fourth embodiments, a slit 53γ is formed through the upper and lower surfaces of a top plate of a rotating lid 5γ, and extends from the center to an inner peripheral ring 511 along the radius of the rotating lid 5γ.

Further, a cutter has approximately the same length as the slit 53γ, such that the cutter is connected to the radial edge on the downstream side in the rotation direction A of the rotating lid 5γ (that is, the edge on the far side in FIG. 20), and is embedded into the fitting projection 55 provided at the center of the rotating lid 5γ.

In the third modification, in the rotating lid 5γ, a rising portion 57 is formed on the perimeter of the slit 53γ. The rising portion 57 rises from an upper surface 51Uγ of the top plate having a flat shape. The rising portion 57 on the perimeter of the slit 53γ is curved such that the height of the rising portion 57 increases from the center side toward the outer peripheral side of the rotating lid 5γ.

With this configuration, similar to the rotating lid 5 illustrated in FIG. 5B above, the rotating lid 5γ is suitable for the user to scrape cut pieces of the solid material from the center toward the outer peripheral side by sliding the finger in the direction parallel to the extending direction of the slit 53γ.

(Rotating Lid of Fourth Modification)

Figure 21:
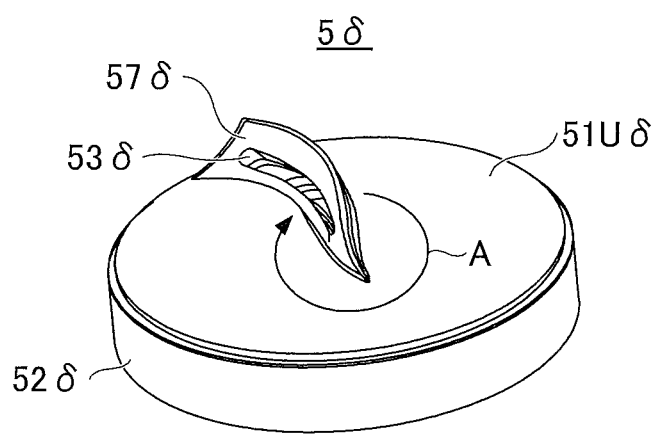
FIG. 21 is a perspective view of a rotating lid according to a fourth modification of the present invention.

FIG. 21 is a perspective view of a rotating lid according to a fourth modification of the present invention.

In the fourth modification, a top plate of a rotating lid 5δ includes a rising portion 57δ that is curved and extends between the center and the outer peripheral edge of the rotating lid 5δ. The rising portion 57δ is formed in a cone-like shape (a deformed triangle shape) having a tapered upper portion as viewed from the side.

In this configuration, a slit 53δ, which is an example of an outlet, is formed in an inclined and curved surface, on the upstream side in the rotation direction A of the rotating lid 5δ during use, of the rising portion 57δ. The slit 53δ is curved in a crescent shape following the curved rising portion 57δ.

Further, although not illustrated, a cutter (not illustrated) is provided so as to follow the outer arc of the curved slit 53δ. The cutter provided in the rotating lid 5δ has approximately the same length as the outer arc, on the downstream side in the rotation direction of the rotating lid 5δ, of the slit 53δ, such that the cutter is embedded into the fitting projection 55 provided at the center of the lower surface of the rotating lid 5δ.

The curved slit 536 having the crescent shape illustrated in FIG. 21 is a groove having a strip shape that protrudes toward the downstream side in the direction of clockwise rotation. Therefore, thin pieces of the contents cut by the cutter can be readily collected in the center of the curved slit 53δ.

Further, in this configuration, the slit 53δ is formed in the recessed surface of the rising portion 57δ, and the rising portion 57δ has the cone-like shape that is tapered upward. Accordingly, the rotating lid 5δ is suitable for the user to collect a predetermined amount of the solid material by placing the finger on the recessed surface of the rising portion 57δ having the protruding shape, and by sliding the finger along the perimeter of the curved slit 53δ.

In the above-described first through fourth embodiments and first through fourth modifications, the cap 6, an outer lid as illustrated in FIG. 9A, can be attached to the rotating lid 5 so as to surround the top and sides of the rotating lid 5. However, the cap 6 may be integrated into the rotating lid 5.

(Rotating Lid of Fifth Modification)

Figure 22A:
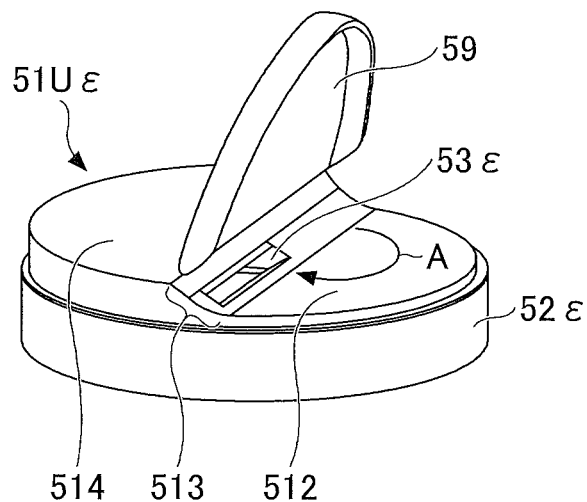
FIG. 22A is a perspective view of a movable lid, which is open, of a rotating lid according to a fifth modification of the present invention.
Figure 22B:
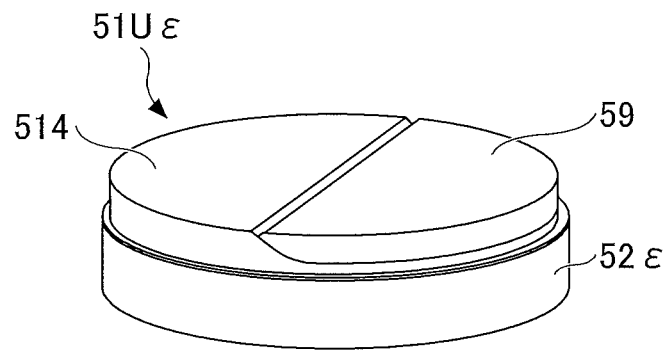
FIG. 22B is a perspective view of the movable lid, which is closed, of a rotating lid according to the fifth modification of the present invention.

FIG. 22A and FIG. 22B are perspective views of a rotating lid according to a fifth modification of the present invention. In the fifth modification, a rotating lid 5ε integrated with an openable lid is depicted. FIG. 22A depicts a movable lid 59 that is open, and FIG. 22B depicts the movable lid 59 that is closed.

Referring to FIG. 22A, an upper surface 51Uε of the rotating lid 5ε according to the fifth modification serves as a half-open lid. The rotating lid 5ε includes the movable lid 59 and fixed portions (512, 513, and 514). The movable lid 59 has a semi-circular shape and is pivotable with the diameter of the semi-circular upper surface 51Uε as an axis.

The rotating lid 5ε according to the fifth modification includes a flat portion 512 and an inclined portion 513 in an area that is covered by the movable lid 59 when the movable lid 59 is open. A slit 53ε extending approximately in the radial direction is formed in the inclined portion 513.

Further, the rotating lid 5ε includes a fixed upper surface 514 in an area that is not covered by the movable lid 59 when the movable lid 59 is closed. In the fifth modification, when the movable lid 59 is closed as illustrated in FIG. 22B, the height of the fixed upper surface 514 is approximately the same as the height of the movable lid 59. Therefore, the inclined portion 513 is inclined so as to continuously connect the flat portion 512 to the fixed upper surface 514 without height differences.

In the fifth modification, the configuration of the slit 53E on the lower surface side of the top plate is similar to that illustrated in FIG. 8A. A cutter provided in the rotating lid 5ε has approximately the same length as the slit 53ε such that the cutter is embedded into the fitting projection 55 provided at the center of the lower surface of the rotating lid 5ε.

In this configuration, because the slit 53E is formed in the inclined portion 513, the user can readily pick up pieces of the solid material by sliding the finger along the inclined portion 513 around the slit 53ε.

Further, in this configuration, the movable lid 59 configured to cover the slit 53ε is integrated into the rotating lid 5ε. Therefore, it is not necessary for the user to attach and remove a separate cap when using the rotating lid 5ε. Thus, the time related to the opening/closing of the lid can be reduced.

Further, as compared to the separate cap 6 (see FIG. 9B), the movable lid 59 is located close to the slit 53ε when the movable lid 59 is closed. Therefore, an effect of preventing the contents from drying when the movable lid 59 is closed can be increased.

((Improvement in Helical Tube))
<Helical Tube According to Modification>

In the above-described embodiments, the lower ends of the helical tubes 2 and 2A are flat as illustrated in FIG. 2, FIG. 8A, FIG. 14, and FIG. 16. However, tapered portions may be formed on the lower ends of the helical tubes 2 and 2A.

FIG. 23 is an enlarged view of a helical tube and a central recess in the bottom surface of a storage part.

As illustrated in FIG. 23, tapered portions 24a and 24b having an annular shape are formed at the lower end, below the helical groove 21, of the helical tube 2D. One side of each of the tapered portions 24a and 24b extends vertically downward, and the other side is inclined and curved along the outer periphery of the helical tube 2D. Specifically, each of the tapered portions 24a and 24b (hereinafter may be collectively referred to as a tapered portion 24) has an inclined lower edge 25 that is inclined, and a vertical edge 26 that extends vertically downward.

A central recess 121D, which is a circular recess, is formed in the center of a bottom surface 12D of a storage part 1D. A support projection 131 is provided in the center of the central recess 121D. In addition, two tapered receiving portions 133a and 133b (hereinafter may be collectively referred to as an annular tapered receiving portion 133), which are formed in an annular shape, are provided so as to surround the support projection 131.

In the present modification, the annular tapered receiving portion 133 includes a helical receiving surface 134 and a raised surface 135. The helical receiving surface 134 is an upper surface having a shape of a helix that rises counter-clockwise while rotating, and the raised surface 135 extends approximately vertically.

The inclination of the inclined lower edge 25 of the tapered portion 24 of the helical tube 2D is approximately equal to the inclination of the helical receiving surface 134 of the annular tapered receiving portion 133. In addition, the helical receiving surface 134 that receives the lower end portion of the helical tube 2D has a shape of a helix. Accordingly, the helical tube 2D can be raised with respect to the bottom surface 12D of the storage part 1D.

Similar to the above-described embodiments, the cross-shaped support projection 131 provided on the bottom surface 12 of the storage part 1 contacts the inner surface of the hollow portion 23 of the helical tube 2D, without being fitted to the hollow portion 23. Accordingly, the upright state of the helical tube 2D can be maintained by the support projection 131.

FIG. 24 is an enlarged view of the helical tube of FIG. 23, in which the position movement of the helical tube at the start of use is depicted. FIG. 24 (a) depicts the position of the helical tube 2D before use, and FIG. 24 (b) depicts the position of the helical tube 2D after the start of use.

As described above, the inclination of the inclined lower edge 25 of the helical tube 2D is approximately equal to the inclination of the helical receiving surface 134. Thus, the inclined lower edge 25 of the tapered portion 24 of the helical tube 2D is in contact with the helical receiving surface 134 of the annular tapered receiving portion 133 before use.

When the helical tube 2D rotates together with the rotating lid 5, the helical tube 2D rotates around the support projection 13. At this time, as illustrated in FIG. 24 (b), the inclined lower edge 25 of the tapered portion 24 of the helical tube 2D slides along the helical receiving surface 134 of the annular tapered receiving portion 133, such that the helical tube 2D is raised with respect to the annular tapered receiving portion 133.

Figure 25:
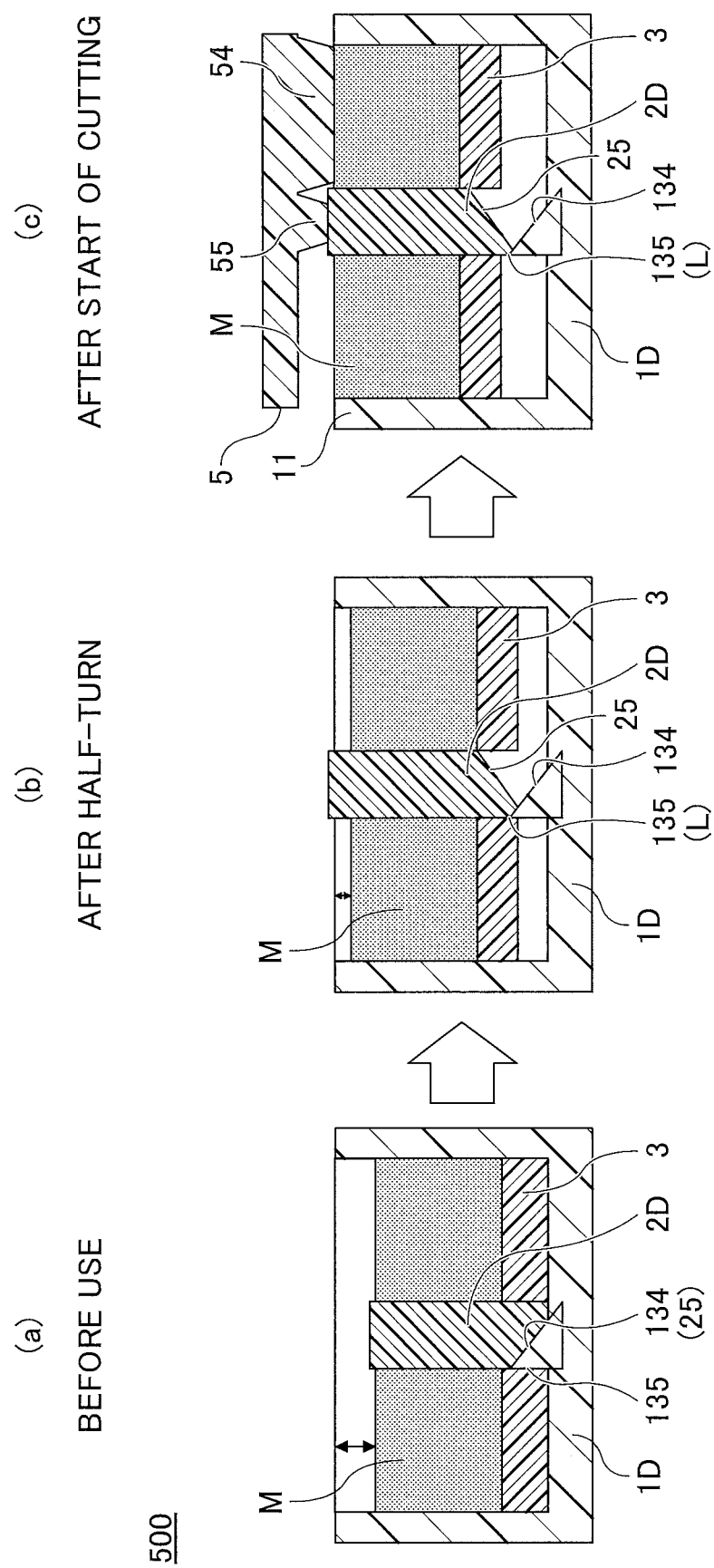
FIG. 25 is a schematic diagram illustrating the position of a solid material when the solid material starts to be cut by a cutter of a dispensing container that includes the helical tube according to the modification of FIG. 23.

FIG. 25 is a schematic diagram illustrating the position of a solid material when the solid material starts to be cut by a cutter of a dispensing container 500 that includes the helical tube 2D according to the modification of FIG. 23.

FIG. 25 (a) depicts the position of a solid material M before use, FIG. 25 (b) depicts the position of the solid material M after the rotating lid 5 is relatively rotated with respect to the storage part 1D a half-urn, and FIG. 25 (c) depicts the position of the solid material M when the solid material M starts to be cut.

The helical projection 32 in the hole 31 of the movable plate 3 engages the lower end of the helical groove 21 of the helical tube 2D, and in this configuration, the solid material M (also referred to as contents) is placed on the movable plate 3.

In this configuration according to the modification, in a state before use as illustrated in FIG. 24 (a) and FIG. 25 (a), the helical tube 2D is located at the lowermost position where the inclined lower edge 25 of the tapered portion 24 at the lower end of the helical tube 2D is in contact with the helical receiving surface 134 of the annular tapered receiving portion 133 at the bottom surface 12D of the storage part 1D.

When the rotating lid 5 relatively rotates with respect to the storage part 1D a half-turn in the rotation direction from the state illustrated in FIG. 25 (a), the inclined lower edge 25 of the tapered portion 24 at the lower end of the helical tube 2D is separated and is slightly raised from with the helical receiving surface 134 of the annular tapered receiving portion 133 at the tapered portion 24 as illustrated in FIG. 25 (b). In this state, the lowest point L of the vertical edge 26 of the helical tube 2D is in contact with the upper end of the raised surface 135 of the annular tapered receiving portion 133. In addition, in this state, the upper end of the helical tube 2D abuts the cross-shaped fitting projection 55 of the rotating lid 5 and the helical tube 2D is stopped.

Then, as illustrated in FIG. 25 (c), when the solid material M is raised and reaches the upper end of the peripheral wall 11 of the storage part 1D, the lower edge 54L of the cutter 54 starts to contact the upper surface of the solid material M. As a result, the solid material M starts to be cut.

Accordingly, when the rotating lid 5 is rotated from the state illustrated in FIG. 25A to the state illustrated in FIG. 25B, the helical tube 2D is raised, thereby causing the movable plate 3 to be raised by a distance greater than or equal to a pitch of the helical groove 21.

Note that, in the basic configuration in which the tapered portion 24 and the annular tapered receiving portion 133 of FIG. 24 are not included, the position of the helical tube within the storage part remains unchanged even when the rotating lid 5 relatively rotates with respect to the storage part. After the rotating lid rotates a half-turn, the movable plate 3 is raised by half the pitch of the helical groove 21.

As compared to the basic configuration, in this modification, the distance between the upper surface of the contents (solid material M) and the cutter 54 decreases by only a half-turn rotation from the state illustrated in FIG. 25(a) to the state illustrated in FIG. 25(b). That is, the distance required to raise the movable plate 3 can be decreased, and the number of turns required before the contents start to be cut can be reduced.

Although the lower end of the helical tube 2D is supported at only two points during use, the helical tube 2D can be stably maintained. This is because the support projection 131 is inserted into the hollow portion 23 so as to support the helical tube 2D, and also, resistance is generated in the solid material M between the helical groove 21 of the helical tube 2D and the inner surface of the peripheral wall 11 of the storage part 1D. Thus, the helical tube 2D can be stably maintained.

Further, in FIG. 23 and FIG. 24, in the helical tube 2D, the annular lower edge of 360° is divided into the two tapered portions 24a and 24b of 180°; however, three or more tapered portions may be provided at intervals of a predetermined angle. In this case, tapered receiving portions divided in correspondence with the tapered portions are provided at the bottom surface of the storage part.

Note that the configuration of the inclined lower edge of the helical tube may be applied to any of the above-described first through fourth embodiments.

<Cutter According to Modification>

In the above-described first through fourth embodiments, the lower edge of the cutter of the top plate of each of the rotating lids 5 (5A, 5B, and 5C) is approximately horizontal. However, the lower edge of the cutter may be inclined.

Figure 26:
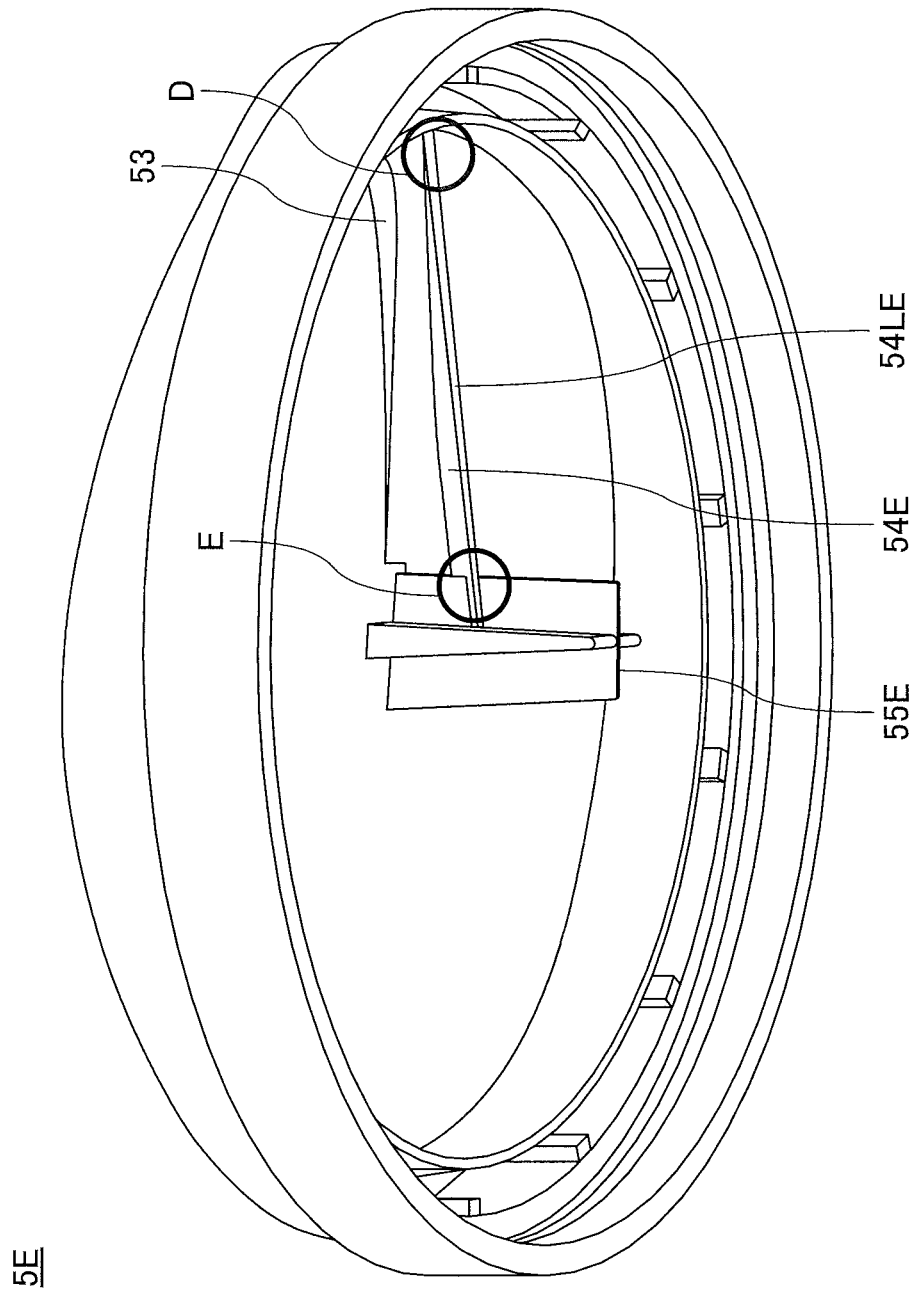
FIG. 26 is a perspective view of the lower surface of a rotating lid provided with a cutter according to a modification.

FIG. 26 is a perspective view of the lower surface of a rotating lid 5E provided with a cutter according to a modification.

In this configuration, a lower edge 54LE of a cutter 54E, which is a cutting blade for cutting the solid material M (contents M), is inclined upward from the center side toward the outer peripheral side of the rotating lid 5E.

Figure 27:
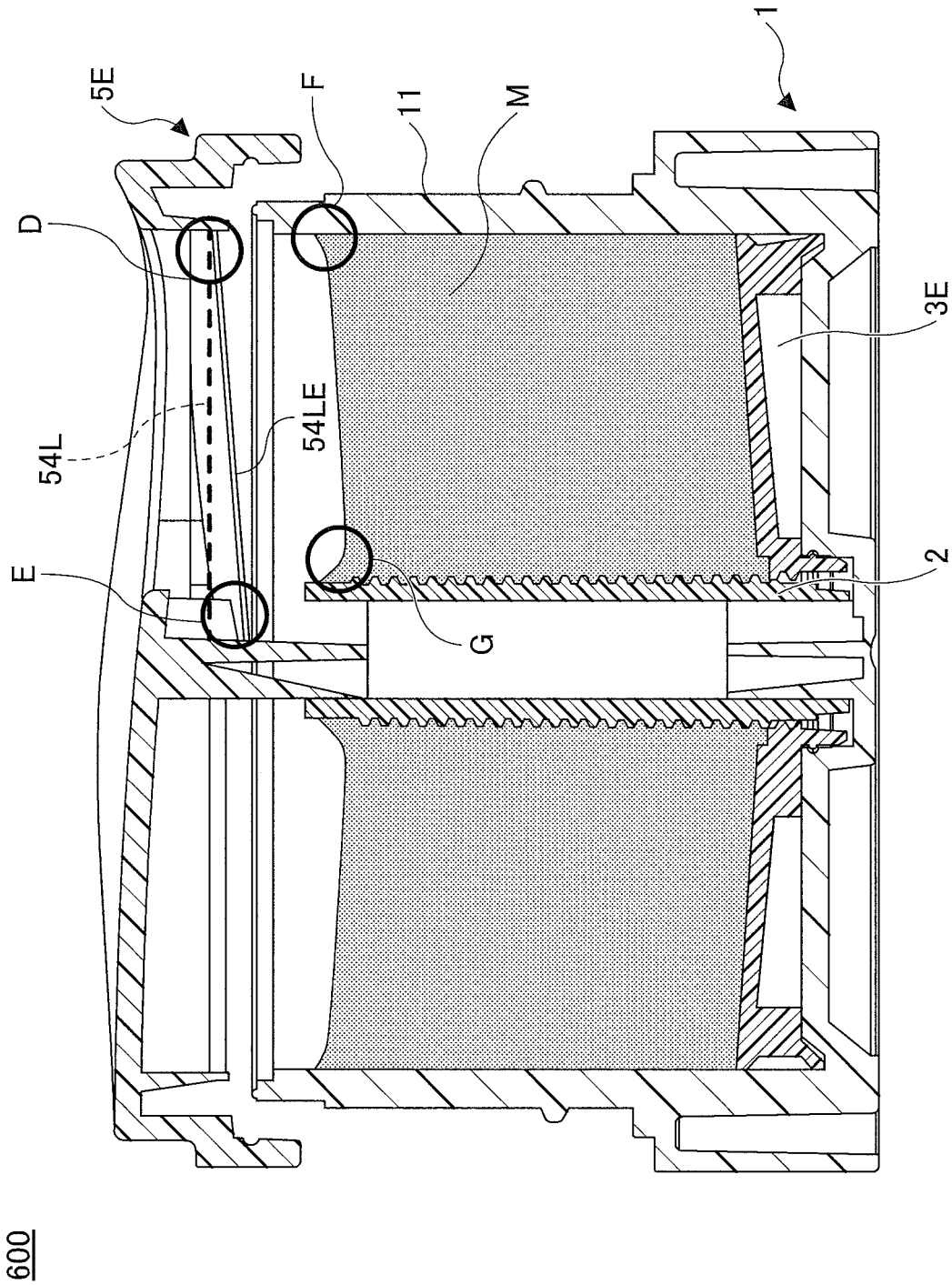
FIG. 27 is a projection view of the contents contained in the storage part of a dispensing container that includes the rotating lid of FIG. 26.

FIG. 27 is a projection view of the contents M contained in the storage part 1 of a dispensing container 600 according to the present modification. In FIG. 27, the lower edge 54L of the cutter 54 according to the first embodiment is indicated by a dashed line. The dispensing container 600 according to the present modification has the same configuration as that of the first embodiment, except for the shape of the cutter 54E. In FIG. 27, for the purpose of explanation, the rotating lid 5E is depicted at a position that is above the actual position.

As illustrated in FIG. 27, the surface of the solid material M, which is the contents of the storage part 1, rises from the center toward the outer periphery of the storage part 1 due to surface tension when the storage part 1 is filled with the solid material M.

Therefore, when the contents (solid material M) start to be cut, the contents can be cut more evenly and faster by making the inclination of the lower edge 54LE of the cutter 54E close to the inclination of the upper surface of the contents, which is caused by the surface tension. For example, the inclination angle of the lower edge 54LE (between the end on the center side to the middle of the lower edge) of the cutter 54E is approximately 2° to 20° in the projection view.

As the cutter 54E is attached so as to twist, the inclination angle of a center portion E, located at the center of rotation, of the lower edge 54LE of the cutter 54E differs from the inclination angle of an outer peripheral portion D of the lower edge 54LE. The inclination of the upper surface the solid material M at the time of filling varies depending on the hardness of the solid material M. Therefore, it is preferable to set the angle of the lower edge 54LE of the cutter 54E in accordance with the hardness of the solid material M.

Further, as illustrated in FIG. 27, because the solid material M adheres to the surface, an outer peripheral raised portion F is formed in the vicinity of the inner surface of the peripheral wall 11, and a center raised portion G is formed in the vicinity of the helical tube 2.

In the dispensing container with the cutter having the horizontal lower edge 54L, the outer peripheral part of the lower edge 54L of the cutter contacts the outer peripheral raised portion F of the contents, as indicated by a circle in FIG. 27. Therefore, the cutter starts to cut the outer peripheral raised portion F of the contents first.

Conversely, as illustrated in FIG. 26, in the rotating lid 5E provided with the cutter 54E having the inclined lower edge 54LE, the outer peripheral portion D and the center portion E, indicated by circles in FIG. 26, of the lower edge 54LE of the cutter 54E contact the outer peripheral raised portion F and the center raised portion G of the contents, indicated by circles in FIG. 27. Therefore, the cutter 54E can start to cut both the outer peripheral raised portion F and the center raised portion G. As illustrated in FIG. 27, the inclination of the lower edge 54LE of the cutter 54E is close to the inclination of the upper surface of the contents (solid material M), which is caused by surface tension. Accordingly, when the contents start to be cut, the contents can be cut more evenly and faster by the cutter 54E having the lower edge 54LE that is inclined upward from the center side toward the outer peripheral side of the rotating lid 5E.

Accordingly, the cutter 54E having the lower edge 54LE that is inclined upward toward the outer periphery side can reduce the number of turns required before the contents start to be evenly cut.

According to the present modification, because the number of turns required before the contents start to be evenly cut can be reduced, the user can start to use the contents faster if the user wishes to cut an even amount of the contents by measuring the contents.

Figure 28:
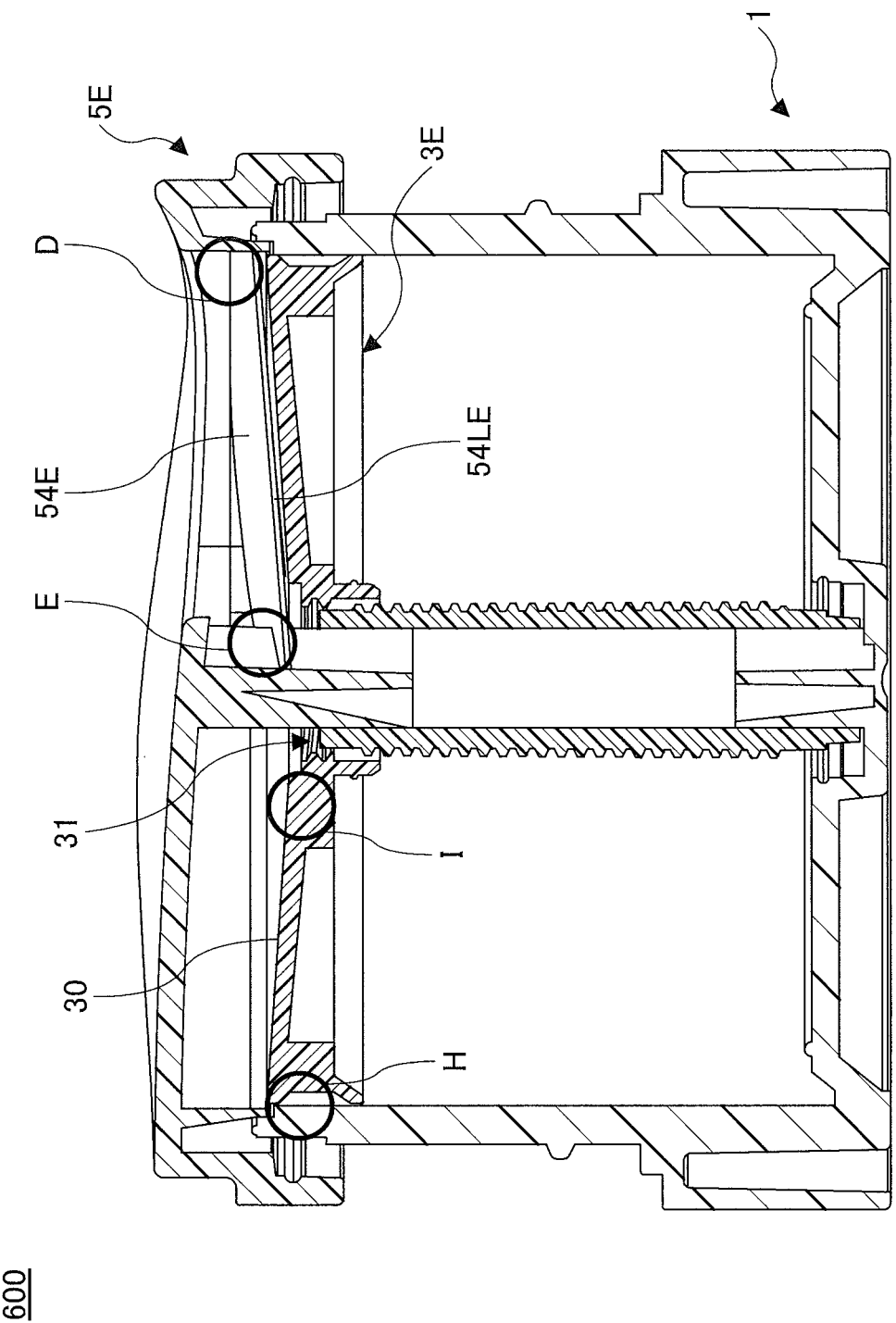
FIG. 28 is a cross-sectional view of the dispensing container that includes the rotating lid of FIG. 26, in which a movable plate is raised to approximately the upper end.

FIG. 28 is a cross-sectional view of the dispensing container 600 that includes the rotating lid 5E of FIG. 26, in which a movable plate 3E is raised to approximately the upper end.

In this configuration, the lower edge 54LE of the cutter 54E provided in the rotating lid 5E is inclined. Therefore, the center of an upper surface 30 of the movable plate 3E, used together with the cutter 54E, is recessed in a bowl shape.

Specifically, the upper surface 30 on the center side I of the movable plate 3E is lower than that on the outer peripheral side H. The inclination from the center side I toward the outer peripheral side H of the upper surface 30 is approximately equal to the inclination from the outer peripheral portion D toward the center portion E of the lower edge 54LE of the cutter 54E.

In the dispensing container 600 with the cutter having the above-described configuration, the lower edge 54LE of the cutter 54E can evenly cut the approximately entire area, in the radial direction, of the solid material M placed on the upper surface 30 of the movable plate 3E until the last piece of the solid material. Accordingly, even if the amount of the solid material M, which is the contents, decreases, the contents can be cut evenly and used until the last piece of the solid material.

In the above-described modification, the inclined cutter 54E is applied to the configuration of the rotating lid 5 of FIG. 7; however, the inclined cutter 54E may be applied to the configurations of the rotating lids 5A, 5B, and 5C according to the other embodiments and the configurations of the rotating lids 5α, 5β, 5γ, 5δ, and 5ε according to the first to fourth modifications illustrated in FIG. 18 through FIG. 22.

((Improvement in Inner Rib))

<Inner Rib According to Modification>

A rotation restriction rib according to a modification is provided with a step in order to stabilize a movable plate in the horizontal direction when the movable plate has reached the upper limit position.

Figure 29:
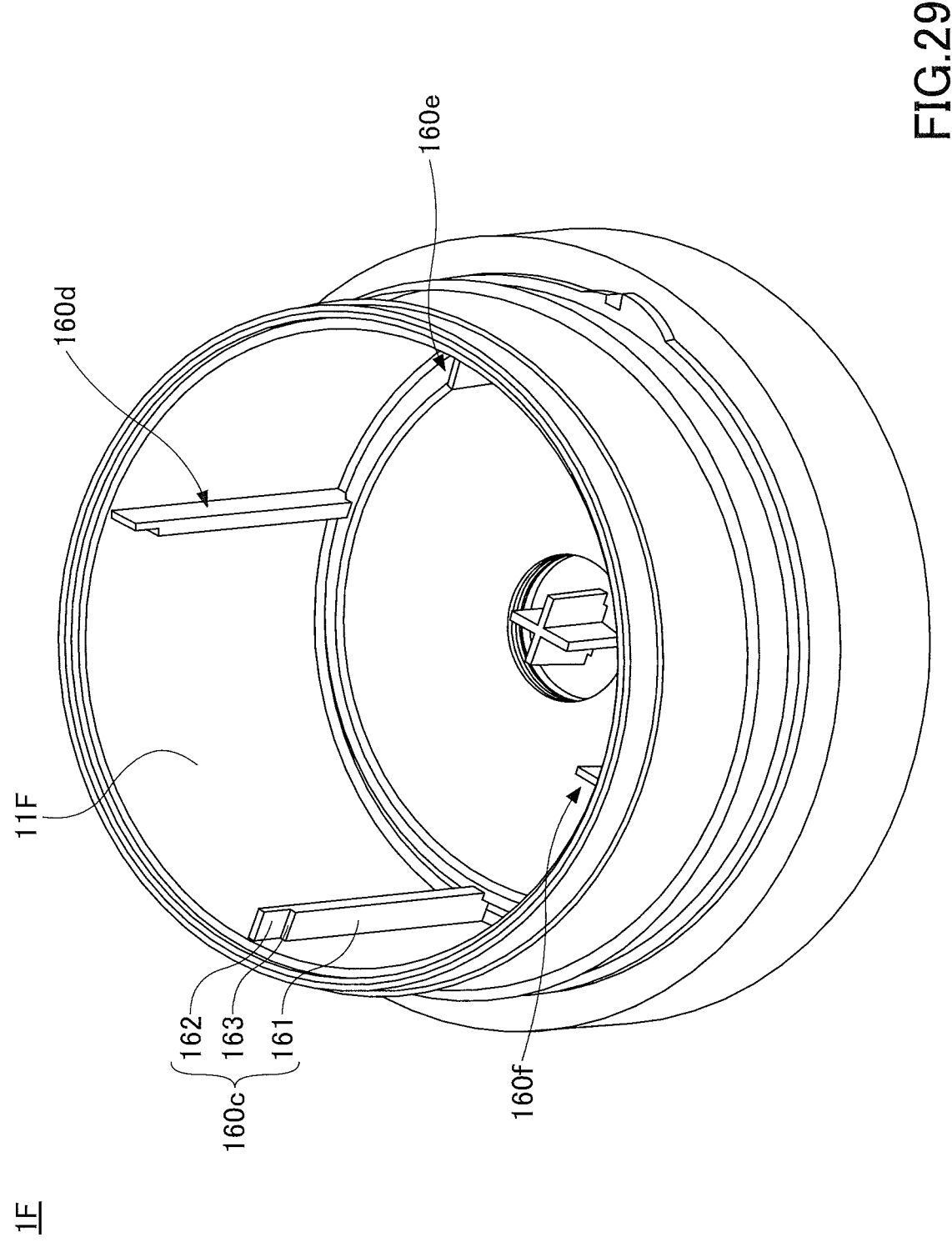
FIG. 29 is a diagram illustrating a storage part according to a modification.

FIG. 29 is a diagram illustrating a storage part according to a modification.

In this modification, a plurality of inner ribs 160c, 160d, 160e, and 160f are formed on the inner peripheral surface of a peripheral wall 11F of a storage part 1F. The inner ribs 160c, 160d, 160e, and 160f extend in the vertical direction and protrude inward. Each of the inner ribs 160 is constituted by a body portion 161 and a thin portion 162. The thin portion 162 is situated at the upper end of the each of the inner ribs 160, and a step 163 is formed below the thin portion 162. The inner ribs 160c through 160f have approximately the same shapes as the inner ribs 116a and 116b according to the first embodiment, except for the upper ends. The inner ribs 160c through 160f serve as stoppers for regulating the rotation of a movable plate 3F when the movable plate 3F is raised with respect to the storage part 1F.

Figure 30:
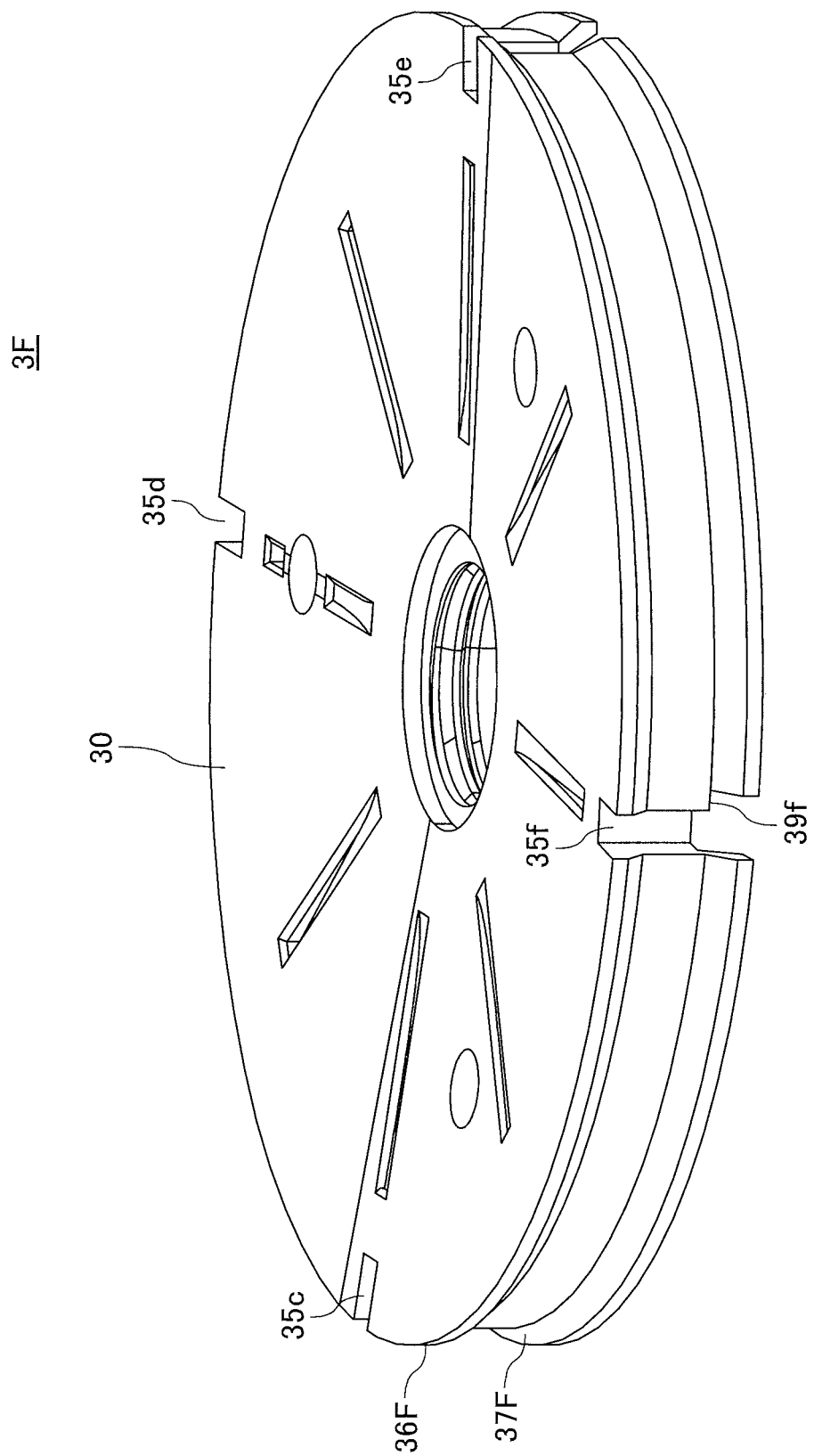
FIG. 30 is a perspective view of the upper surface of a movable plate used together with the storage part of FIG. 29.
Figure 31:
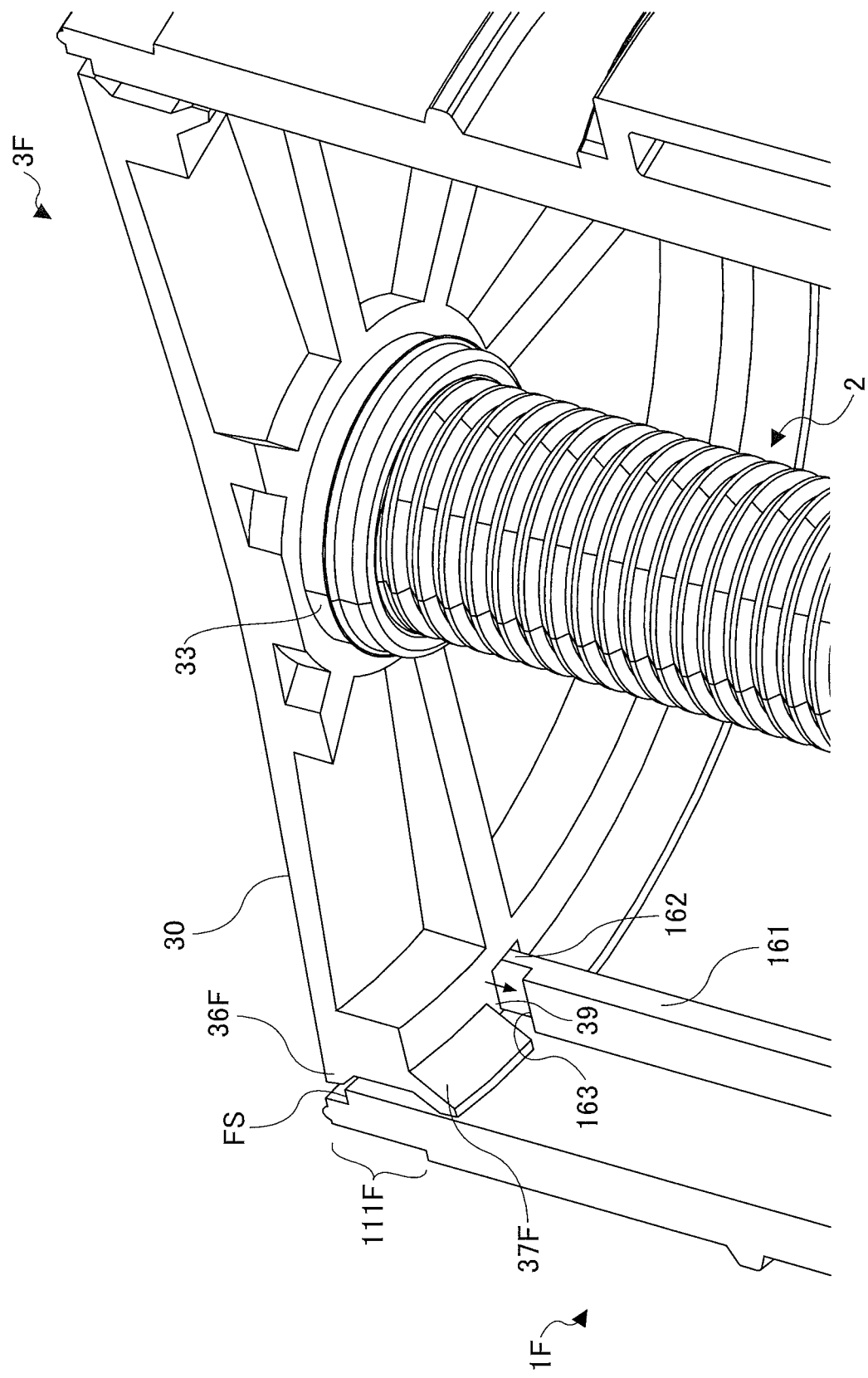
FIG. 31 is a cross-sectional view of the movable plate of FIG. 30 that is raised to the upper limit position within the storage part of FIG. 29.

FIG. 30 is a perspective view of the upper surface of the movable plate 3F according to the modification. FIG. 31 is a cross-sectional view of the movable plate 3F according to the modification that is raised to the upper limit position within the storage part 1F. In FIG. 31, for the purpose of explanation, the movable plate 3F is depicted at a position that is above the actual position.

As illustrated in FIG. 30, four slits 35c, 35d, 35e, and 35f are formed on the outer peripheral edge of the movable plate 3F, and the inner ribs 160c, 160d, 160e, and 160f are inserted into the slits 35c, 35d, 35e, and 35f, respectively.

An inclined upper edge 36F that extends from and is continuous with the upper surface 30, and an inclined lower edge 37F that extends downward from the lower surface of the movable plate 3F are formed on the outer periphery of the movable plate 3F. The upper surface 30 is inclined upward toward the outer periphery from the center thereof.

Further, a notch is formed on the inclined lower edge 37F such that the width on the lower side of the slit 35f is increased. In other words, a lower end portion of the inclined lower edge 37F is notched so as to form a step 39f in the slit 35f, such that the width on the lower side of the slit 35f is greater than that on the upper side. In FIG. 30, only the step 39f is depicted; however, steps 39c, 39d, and 39e are formed in the slits 35c, 35d, and 35e in the same manner by notching lower end portions of the inclined lower edge 37F.

In a dispensing container according to this modification, the helical projection 32 (not illustrated) of the hole 31 of the movable plate 3F engages the helical groove 21 of the helical tube 2, and the movable plate 3F is raised by rotation.

As illustrated in FIG. 31, when the movable plate 3F is raised beyond the upper end of the helical groove 21 of the helical tube 2F, the steps 39c through 39f of the movable plate 3F, where the widths of the slits 35c through 35f are increased, are raised onto the steps 163c through 163f of the plurality of inner ribs 160c through 160f.

Note that a step FS is formed on the inner periphery of a thin upper portion 111F of the storage part 1F; however, the inclined upper edge 36F is not raised onto the step FS. This is because the distance between the outer peripheral end of the inclined upper edge 36F and the center of the movable plate 3F is the same as the distance between the outer peripheral end of the inclined lower edge 37F and the center of the movable plate 3F.

Figure 32:
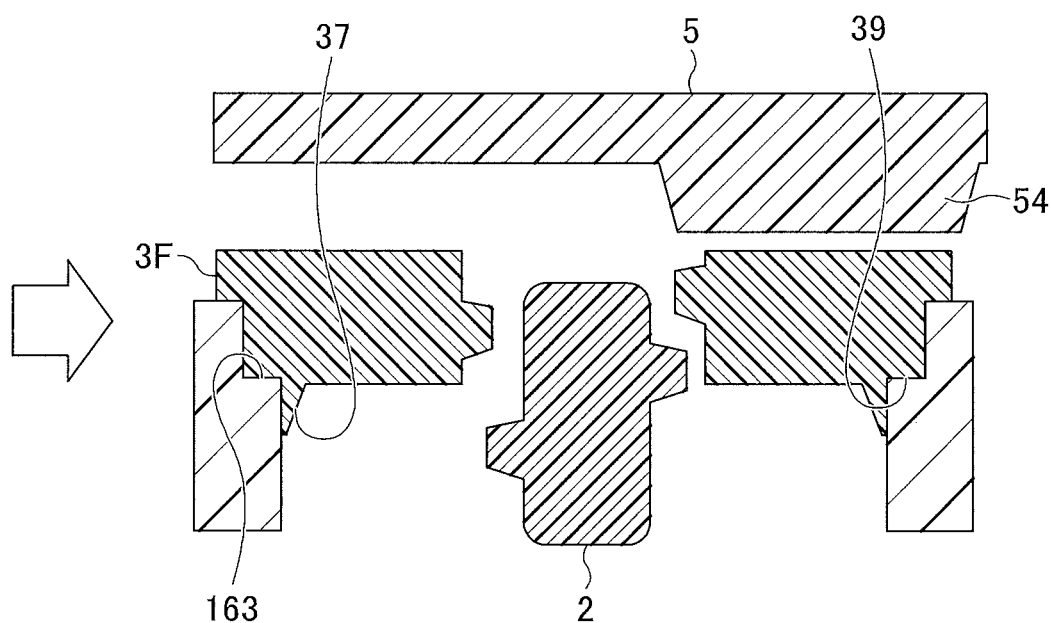
FIG. 32 is a schematic diagram illustrating a dispensing container that includes the storage part according to the modification of FIG. 29, in which the movable plate is raised to the upper limit position.

FIG. 32 is a schematic diagram illustrating a dispensing container 700 that includes the storage part 1F according to the modification of FIG. 29, in which the movable plate is raised to the upper limit position.

In the dispensing container 700 with this configuration, the helical projection 32 of the hole 31 of the movable plate 3F engages the helical groove 21, and the movable plate 3F is raised by rotation.

As a comparison, a configuration in which the inner ribs 160c through 160f do not have steps 163 is assumed. In this configuration, if the helical projection 32 of the movable plate 3 rotates beyond the upper end of the helical groove 21, there would be no thread engagement between the helical projection 32 and the helical groove 21. In this state, when cutting resistance is generated, a portion of the movable plate 3 facing the cutter 54 would be moved downward.

Conversely, in this modification, as illustrated in FIG. 32, when the helical projection 32 of the movable plate 3 rotates beyond the upper end of the helical groove 21 and the helical projection 32 no longer engages the helical groove 21, the steps 39c through 39f of the movable plate 3F are raised onto the steps 163 of the inner ribs 160c through 160f, thus allowing the movable plate 3F to be stabilized at the time of cutting. Accordingly, in a state in which the helical projection 32 of the movable plate 3F is raised beyond the upper end of the helical groove 21 of the helical tube 2, even if downward pressure is applied to the movable plate 3F from the cutter 54, the movable plate 3F can continue to be rotated stably without moving downward.

Accordingly, the steps 163 on the inner ribs 160c through 160f formed on the inner peripheral surface of the peripheral wall 11F of the storage part 1F can reduce the remaining contents that are unable to be scraped off the movable plate 3F by the cutter 54.

In this configuration, the four inner ribs 160c through 160f are provided as illustrated in FIG. 29. However, as long as two or more inner ribs 160 are provided, with adjacent inner ribs 160 being equally spaced, any number of inner ribs 160 may be provided so as to stabilize the movable plate 3F that is raised beyond the upper end of the helical groove 21.

The above-described configuration having the inner ribs according to the modification can be applied to the first embodiment, the third embodiment, and the fourth embodiment in which two or more inner ribs are provided.

Although the embodiments of the present invention have been described in detail above, the present invention is not limited to the particulars of the above-described embodiments. Variations and modifications may be made without departing from the scope of the present invention described in the claims.

The present application is based on and claims priority to Japanese Patent Application No. 2018-197870 filed on Oct. 19, 2018, with the Japanese Patent Office, the entire contents of which are hereby incorporated by reference.

DESCRIPTION OF REFERENCE NUMERALS 1, 1A, 1B, 1C, 1D, 1F storage part (container body)
11, 11A, 11B, 11C peripheral wall
111, 111A thin upper portion
112, 112A, 112B, 112C central tube portion
113 double-walled lower portion
114, 114A, 114B, 114C outer peripheral thread projection
115 fitting portion
116a, 116b inner rib
117 stopper
118 outer annular projection 12, 12A, 12D bottom surface
125 ring-shaped projection
13 support projection
131 support projection
133 (133a, 133b) annular tapered receiving portion
134 (134a, 134b) helical receiving surface
135 (135a, 135b) raised surface
160 (160c, 160d, 160e, 160f) inner rib
163 (163c, 163d, 163e, 163f) step
2, 2A, 2D helical tube
21 helical groove
22 cross-shaped groove
22A groove
23 hollow portion
24(24a, 24b) tapered portion
25(25a, 25b) inclined lower edge
26(26a, 26b) vertical edge
3, 3A, 3F movable plate
31 hole
32 helical projection
33 collar portion
34 outer peripheral projection
35a, 35b, 35c, 35d, 35e, 35f slit
36 inclined upper edge
37 inclined lower edge
39c, 39d, 39e, 39f step
4 tubular cover
41 upper small-diameter portion
42 tubular portion 42
43 outer annular projection
45 thick upper portion
46 thin upper portion
47 inner peripheral thread projection
48 projection (undercut)
5, 5A, 5B, 5C, 5α, 5β, 5γ, 5δ, 5ε rotating lid
51, 51A, 51B, 51C top plate
51U, 51α, 51β, 51γ, 51δ, 51ε upper surface of top plate
51O outer peripheral surface (upper peripheral wall) of top plate
52, 52A, 52B, 52C peripheral wall
521, 521A inner annular groove
53, 53α, 53γ, 53δ, 53ε slit (outlet)
53β circular hole (outlet)
54, 54A cutter
55, 55A fitting projection
57, 57δ rising portion
59 movable lid
6 cap
100, 200, 300, 400, 500, 600, 700 dispensing container with cutter
M solid material (contents)
α lid unit (solid material rotary cutting lid)
β refill (solid material container, bottle body)

The invention claimed is:

1. A dispensing container with a cutter, the dispensing container comprising:
a storage part having a tubular shape with an opening at a top and configured to contain a solid material;
a helical tube having a helical groove on an outer peripheral surface of the helical tube, and configured to be attached to a bottom surface of the storage part;
a rotating lid disposed to be horizontally rotatable and including a top plate and a peripheral wall that is a side surface of the rotating lid, the top plate being provided with the cutter on an underside of the top plate and the top plate having an outlet, the cutter being configured to cut the solid material into a thin piece and the outlet being configured to discharge the cut thin piece of the solid material; and
a movable plate having a hole into which the helical tube is fitted, and configured to be raised within the storage part in conjunction with rotation of the rotating lid,
wherein the top plate of the rotating lid has a fitting projection that extends downward to be inserted into an upper end of the helical tube so as to cause the helical tube to rotate together with the rotating lid, the dispensing container further comprising a tubular cover that covers a part of an outer peripheral surface of the storage part from side portions of the storage part,
wherein an inner peripheral surface of the peripheral wall of the rotating lid engages an outer peripheral surface of the tubular cover such that the rotating lid is freely rotatable with respect to the tubular cover, and
wherein the movable plate is configured to be raised in response to relative rotation between the rotating lid and the tubular cover.

2. The dispensing container with the cutter according to claim 1, wherein the storage part, the movable plate, and the helical tube serve as a refill that is replaceable together with the solid material and is attachable to the rotating lid and the tubular cover, and
wherein an inner peripheral surface of the peripheral wall of the tubular cover is screwed onto the outer peripheral surface of the peripheral wall of the storage part.

3. The dispensing container with the cutter according to claim 2, wherein a double-walled lower portion of the storage part that is not covered by the tubular cover when the dispensing container is in an assembled state is provided on a lower side of the outer peripheral surface of the storage part,
wherein a fitting groove is provided on the outer peripheral surface of the storage part and above the double-walled lower portion,
wherein the tubular cover is provided with a projection and the projection is provided in a vicinity of a lower end of the inner peripheral surface of the tubular cover,
wherein the inner peripheral surface of the tubular cover is provided with an inner thread projection and the outer peripheral surface of the storage part is provided with an outer thread projection,
wherein in a case where the refill is attached to the rotating lid and the tubular cover, the projection of the tubular cover makes engagement with the fitting groove of the storage part, by rotating the tubular cover downward with respect to the storage part while causing the inner thread projection of the tubular cover to engage with the outer thread projection of the storage part, and
wherein the storage part is fixed to the tubular cover by the engagement of the projection with the fitting groove when the rotating lid is rotated with respect to the tubular cover.

4. The dispensing container with the cutter according to claim 1, wherein the outer peripheral surface of the tubular cover is provided with an annular projection and the inner peripheral surface of the peripheral wall of the rotating lid is provided with an annular groove, or
the outer peripheral surface of the tubular cover is provided with an annular groove and the inner peripheral surface of the peripheral wall of the rotating lid is provided with an annular projection, and
wherein the rotating lid is rotatable with respect to the tubular cover, with the annular projection engaging the annular groove.

5. The dispensing container with the cutter according to claim 1, wherein an outer periphery of a lower surface of the movable plate is provided with an inclined lower edge that is inclined downward,
   wherein an inner peripheral surface of the storage part is provided with a plurality of inner ribs that extend in a vertical direction and protrude inward, and thin upper portions are formed on upper ends of the inner ribs such that steps are formed below the thin upper portions,
   wherein a plurality of slits are formed on the outer periphery of the movable plate, and the inner ribs are inserted into the respective slits,
   wherein lower end portions of the inclined lower edge are notched so as to form steps in the slits, such that a width on a lower side of each of the slits is greater than a width on an upper side of each of the slits, and
   wherein, upon the movable plate being raised beyond an upper end of the helical groove of the helical tube, the steps in the slits of the movable plate are raised onto the steps of the plurality of inner ribs.

6. The dispensing container with the cutter according to claim 1, wherein a lower end of an inner peripheral surface of the peripheral wall of the rotating lid is provided with an undercut that projects inward,
   wherein the inner peripheral surface of the peripheral wall of the rotating lid engages an outer peripheral surface of a peripheral wall of the storage part such that the rotating lid is freely rotatable with respect to the storage part, and
   wherein, upon the rotating lid being rotated with respect to the storage part in a use direction, the rotating lid and the helical tube are raised by a predetermined amount, are brought into a freely rotatable state at a predetermined position, and are used in the freely rotatable state until end.

7. The dispensing container with the cutter according to claim 1, wherein a lower end of an inner peripheral surface of the peripheral wall of the rotating lid is provided with an undercut that projects inward,
   wherein the inner peripheral surface of the peripheral wall of the rotating lid engages an outer peripheral surface of the storage part such that the rotating lid is freely rotatable with respect to the storage part, and
   wherein, upon the rotating lid being rotated with respect to the storage part in a use direction, the rotating lid is moved down by a predetermined amount, is brought into a freely rotatable state at a predetermined position, and is used in the freely rotatable state until end.

8. The dispensing container with the cutter according to claim 1, wherein the storage part is provided with a stopper that projects in a radial direction toward a center from an inner peripheral surface of the storage part and extends in a vertical direction, and
   the movable plate has a slit that extends in the radial direction and into which the stopper is inserted.

9. The dispensing container with the cutter according to claim 1, wherein a tapered portion is provided at a lower end, below the helical groove, of the helical tube, the tapered portion having one side that extends vertically downward and another side that is inclined and curved along an outer periphery of the helical tube,
   wherein a central recess that is a circular recess is formed in the center of the bottom surface of the storage part, a support projection that supports the helical tube is provided at a center of the central recess, and an annular tapered receiving portion is provided so as to surround the support projection, the annular tapered receiving portion having a helical receiving surface and a raised surface that extends from a lower end of the helical receiving surface,
   wherein the solid material is contained on the movable plate that is coupled to the lower end, below the helical groove, of the helical tube, and
   wherein, upon the rotating lid being rotated with respect to the storage part in a use direction at start of use, an inclined edge of the tapered portion of the helical tube slides along the helical receiving surface of the annular tapered receiving portion, and the helical tube is raised with respect to the annular tapered receiving portion.

10. The dispensing container with the cutter according to claim 1, wherein the cutter is formed integrally with the rotating lid, and is located below and in a vicinity of the outlet of the top plate of the rotating lid.

11. The dispensing container with the cutter according to claim 1, wherein a lower edge of the cutter is inclined upward toward an outer periphery from a center of the rotating lid, and
   a center of an upper surface of the movable plate is recessed in a bowl shape so as to be contactable with the lower edge of the cutter.

12. The dispensing container with the cutter according to claim 1, wherein the outlet is a slit that extends in a radial direction of the top plate of the rotating lid,
   wherein an upper edge of the cutter extends from and is continuous with a surface, on a downstream side in a rotation direction of the rotating lid during use, of the slit, and
   wherein an end portion, on a rotation center side of the rotating lid, of the lower edge of the cutter is embedded into the fitting projection provided at a center of the rotating lid.

13. The dispensing container with the cutter according to claim 12, wherein the slit is formed through an upper surface and a lower surface of the top plate of the rotating lid, and extends along a radius from the center to an outer peripheral edge of the rotating lid,
   wherein a periphery of the upper surface of the top plate of the rotating lid has a wave shape, and
   wherein a perimeter of the slit rises so as to increase in height toward an outer peripheral side.

14. The dispensing container with the cutter according to claim 12, wherein the slit is formed through the top plate of the rotating lid, and extends from the center to a vicinity of an outer peripheral edge along a radius of the rotating lid,
   wherein a perimeter of the slit rises from the upper surface of the top plate having a flat shape, and
   wherein the perimeter of the slit rises so as to increase in height toward an outer peripheral side.

15. The dispensing container with the cutter according to claim 12, wherein a slit is formed through the top plate of the rotating lid, and extends from the center of the rotating lid to a vicinity of an outer peripheral edge of the rotating lid along a radius of the rotating lid, and
   wherein the rotating lid includes a movable lid which movable lid is pivotable relative to a diameter of the top plate of the rotating lid about an axis so as to expose and cover the slit.

16. The dispensing container with the cutter according to claim 1, wherein the top plate of the rotating lid includes a rising portion that is curved so as to protrude toward a downstream side in a rotation direction of the rotating lid during use, wherein the rising portion is formed in a cone-like shape having a tapered upper portion as viewed from a side, and wherein the outlet is formed in an inclined surface on an upstream side of the rising portion, is curved in a crescent shape following the curved rising portion, and extends between a center and a vicinity of an outer peripheral edge of the rotating lid.

17. The dispensing container with the cutter according to claim 1, wherein the outlet formed in the top plate of the rotating lid includes a plurality of groove-shaped slits that are curved so as to protrude toward a downstream side in a rotation direction of the rotating lid during use, the plurality of groove-shaped slits are arranged so as to cover approximately an entire radius of an upper surface of the solid material contained in the storage part when the rotating lid is rotated during use, and the cutter is provided along an outer arc of each of the groove-shaped slits.

18. The dispensing container with the cutter according to claim 1, wherein the outlet formed through the top plate of the rotating lid includes a plurality of circular or elliptical holes, wherein the plurality of circular or elliptical holes are arranged in a staggered pattern such that approximately an entire radius of an upper surface of the solid material contained in the storage part is covered when the rotating lid is rotated during use, and wherein the cutter is provided so as to follow an arc, on a downstream side in a rotation direction of the rotating lid during use, of each of the circular or elliptical holes.

19. A solid material container comprising:

a detachable rotating lid that includes a top plate and a peripheral wall that is continuous with an outer periphery of the top plate, the top plate being provided with a cutter and a fitting projection on an underside of the rotating lid and the top plate having an outlet, the cutter being configured to cut the solid material into a thin piece, the fitting projection extending downward, and the outlet being configured to discharge the cut thin piece of the solid material, and a tubular cover, an outer peripheral surface of the tubular cover being attached to an inner peripheral surface of the peripheral wall of the rotating lid such that the rotating lid is relatively rotatable with respect to the tubular cover, a storage part having a tubular shape with an opening at a top and configured to contain the solid material, the storage part having a cross-shaped support projection;

a helical tube having an upper end engageable with the fitting projection of the rotating lid, and a having a helical groove on an outer peripheral surface of the helical tub, a hollow portion being formed in a lower end portion of the helical tube, and the cross-shaped support projection being inserted into the hollow portion; and a movable plate having a hole into which the helical tube is fitted, and the movable plate is configured to be raised within the storage part in conjunction with rotation of the rotating lid.

* * * * *